(12) United States Patent
Xu et al.

(10) Patent No.: US 12,468,414 B2
(45) Date of Patent: *Nov. 11, 2025

(54) TOUCH PANEL AND PREPARATION METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Peng Xu, Beijing (CN); Wenhui Gao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,160

(22) Filed: Aug. 12, 2024

(65) Prior Publication Data

US 2024/0402843 A1     Dec. 5, 2024

Related U.S. Application Data

(63) Continuation of application No. 17/764,549, filed as application No. PCT/CN2021/093017 on May 11, 2021, now Pat. No. 12,111,992.

(51) Int. Cl.
*G06F 3/044*     (2006.01)
*G06F 3/041*     (2006.01)
*G09G 3/3233*    (2016.01)

(52) U.S. Cl.
CPC .. *G06F 3/0412* (2013.01); *G06F 2203/04103* (2013.01); *G09G 3/3233* (2013.01); *G09G 2300/0426* (2013.01); *G09G 2300/0819* (2013.01); *G09G 2300/0842* (2013.01); *G09G 2300/0861* (2013.01)

(58) Field of Classification Search
CPC ...... G06F 3/04152; G06F 2203/04103; G09G 2300/0426
See application file for complete search history.

(56) References Cited

U.S. PATENT DOCUMENTS

| 9,831,208 B2 * | 11/2017 | Cheng | H01L 24/14 |
| 2021/0005703 A1 * | 1/2021 | Wang | G09F 9/00 |
| 2021/0109639 A1 * | 4/2021 | Hsieh | G06F 3/0412 |

* cited by examiner

*Primary Examiner* — Sanghyuk Park
(74) *Attorney, Agent, or Firm* — Ling Wu; Stephen Yang; Ling and Yang Intellectual Property

(57) ABSTRACT

Disclosed are a touch panel, a preparation method therefor, and a display apparatus. The touch panel includes a touch region and a bonding region on a side of the touch region in a first direction. The bonding region includes: a chip region including a first edge, a second edge, a third edge, and a fourth edge, the first and second edges extend along a second direction, and the first direction intersects the second direction; multiple pins in the chip region and including multiple display pins and multiple touch pins, the multiple display pins are arranged along the first and second edges, the multiple touch pins are arranged along the third and fourth edges, and the multiple display pins are configured to be connected with display signal lines; multiple touch electrodes in the touch region; and multiple touch signal lines in the touch region and the bonding region.

20 Claims, 14 Drawing Sheets

TOUCH PANEL AND PREPARATION METHOD THEREFOR, AND DISPLAY APPARATUS

CROSS-REFERENCE TO RELATED APPLICATIONS

The present application is a continuation of U.S. application Ser. No. 17/764,549 filed on Mar. 29, 2022, which is a U.S. National Phase Entry of International Application PCT/CN2021/093017 having an international filing date of May 11, 2021, the contents disclosed in the above-mentioned applications are hereby incorporated as a part of this application.

TECHNICAL FIELD

The present disclosure relates to, but is not limited to, the field of display technologies, and in particular to a touch panel, a method for preparing the touch panel, and a display apparatus.

BACKGROUND

With rapid development of display technologies, touch screens have been gradually widespread in people's daily life. According to composition structures, touch screens may be divided into Add on Mode type, On Cell type, In Cell type, and so on. According to working principles, touch screens may be divided into capacitive type, resistive type, infrared type, surface acoustic wave type, and so on. A capacitive On Cell type refers to forming a touch structure on a surface of a light-emission side of a display screen, has advantages such as simple structure, small thickness, high transmittance, etc., and thus has gradually replaced the Add on Mode type and has become a mainstream technology.

SUMMARY

The following is a summary of subject matters described in the present disclosure in detail. The summary is not intended to limit scope of protection of claims.

In an aspect, an exemplary embodiment of the present disclosure provides a touch panel, including a touch region and a bonding region located on a side of the touch region in a first direction, wherein the bonding region includes: a chip region, including a first edge, a second edge, a third edge, and a fourth edge, wherein the first edge and the second edge extend along a second direction, the second edge is located on a side of the first edge away from the touch region, and the third edge and the fourth edge extend along the first direction, wherein the first direction intersects with the second direction; multiple pins located in the chip region and including multiple display pins and multiple touch pins, wherein the multiple display pins are arranged along the first edge and the second edge, the multiple touch pins are arranged along the third edge and the fourth edge, and the multiple display pins are configured to be connected with display signal lines; multiple touch electrodes located in the touch region; and multiple touch signal lines located in the touch region and the bonding region, wherein the multiple touch signal lines are correspondingly connected with the multiple touch electrodes and the multiple touch pins.

In an exemplary implementation mode, the chip region includes a first pin region, a second pin region, a third pin region, a fourth pin region, a fifth pin region, and a sixth pin region, wherein the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region.

In an exemplary implementation mode, the multiple display pins include multiple display signal output pins and multiple display signal input pins, wherein the multiple display signal output pins are arranged in the first pin region, and the multiple display signal input pins are arranged in the second pin region; and the multiple display signal output pins are configured to be connected with data signal lines, and the display signal input pins are configured to be connected with an external circuit board through display connection lines and a pin bonding region of the bonding region to enable the external circuit board to provide display signals through the pin bonding region, the display connection lines, and the display signal input pins.

In an exemplary implementation mode, the multiple touch pins include multiple touch signal output pins and multiple touch signal input pins, wherein the multiple touch signal output pins are arranged in the third pin region and the fourth pin region, and the multiple touch signal input pins are arranged in the fifth pin region and the sixth pin region; and the touch signal output pins are configured to be connected with the touch signal lines, the touch signal input pins are configured to be connected with touch input lines, and touch signals are output to the touch signal output pins through the touch input lines and the touch signal input pins.

In an exemplary implementation mode, the chip region has a centerline, the multiple touch pins and the multiple touch signal lines in the chip region are arranged symmetrically relative to the centerline, and the centerline is a straight line extending along the first direction and equally dividing the chip region; the multiple touch signal lines include a first group of touch signal lines and a second group of touch signal lines that are arranged symmetrically relative to the centerline, wherein the first group of touch signal lines include a first output line group and a second output line group, the first output line group includes multiple first touch signal lines, the second output line group includes multiple second touch signal lines, the first output line group is arranged on a side of the second output line group away from the centerline, and the multiple first touch signal lines and the multiple second touch signal lines are correspondingly connected with multiple touch signal output pins in the third pin region; and the second group of touch signal lines include a third output line group and a fourth output line group, the third output line group includes multiple third touch signal lines, the fourth output line group include multiple fourth touch signal lines, the third output line group is arranged on a side of the fourth output line group away from the centerline, and the multiple third touch signal lines and the multiple fourth touch signal lines are correspondingly connected with multiple touch signal output pins in the fourth pin region.

In an exemplary implementation mode, a first touch signal line includes a first output line segment, a second output line segment, a third output line segment, and a fourth output line segment that are sequentially connected, wherein the first output line segment extends along the first direction, the second output line segment and the fourth output line segment extend along the second direction, there is a first included angle between the third output line segment and the second direction, and the first included angle is 20° to 80°.

In an exemplary implementation mode, a second touch signal line includes a first output line segment, a second output line segment, a third output line segment, and a fourth output line segment that are sequentially connected, wherein the second output line segment and the fourth output line segment extend along the second direction, there is a second included angle between the third output line segment and the second direction, and the second included angle is 20° to 80°.

In an exemplary implementation mode, multiple first output line segments include a first output line segment group and a second output line segment group, wherein the first output line segment group includes multiple first broken lines bent in a direction close to the centerline, the second output line segment group includes multiple second broken lines bent in a direction away from the centerline, the multiple first broken lines and the multiple second broken lines form at least one polygonal region, and at least one dummy pin is arranged in the at least one polygonal region.

In an exemplary implementation mode, the chip region further includes at least one dummy pin, wherein the dummy pin is arranged at one or more of following positions: between the first output line group and the second output line group, between the third output line group and the fourth output line group, on a side of the second output line group away from the first output line group, on a side of the fourth output line group away from the third output line group, and on the centerline.

In an exemplary implementation mode, the chip region further includes at least one first connection line, wherein the at least one first connection line is configured to be connected with part of the touch signal input pins, and is arranged on a side of the touch signal input pins close to the centerline.

In an exemplary implementation mode, the chip region further includes at least one second connection line, wherein the at least one second connection line is configured to be connected with part of the display signal input pins, and is arranged on a side of the display signal input pins close to the touch region.

In an exemplary implementation mode, a multi-row staggered arrangement structure is used for multiple pins in at least one of the first pin region, the second pin region, the third pin region, the fourth pin region, the fifth pin region, and the sixth pin region.

In an exemplary implementation mode, single-row transverse alignment is used for pins in the first pin region and/or the second pin region, wherein the multiple pins are sequentially arranged along the second direction and are aligned in the first direction; or, a two-row transverse staggered arrangement structure is used for the pins in the first pin region and/or the second pin region, wherein the two-row transverse staggered arrangement structure includes a first pin row and a second pin row that are arranged along the first direction, multiple pins in the first pin row and the second pin row are sequentially arranged along the second direction, and multiple pins in the first pin row and multiple pins in the second pin row are arranged in a staggered manner in the second direction.

In an exemplary implementation mode, single-row longitudinal alignment is used for at least one of the third pin region, the fourth pin region, the fifth pin region, and the sixth pin region, wherein the multiple pins are sequentially arranged along the first direction and are aligned in the second direction; or, a two-row longitudinal staggered arrangement structure is used for at least one of the third pin region, the fourth pin region, the fifth pin region, and the sixth pin region, wherein the two-row longitudinal staggered arrangement structure includes a first pin column and a second pin column that are arranged along the second direction, multiple pins in the first pin column and the second pin column are sequentially arranged along the first direction, and multiple pins in the first pin column and multiple pins in the second pin column are arranged in a staggered manner in the first direction.

In an exemplary implementation mode, each of the third pin region and the fourth pin region includes multiple touch signal output pins and at least one idle pin, and the touch signal lines are connected with the touch signal output pins and are not connected with the at least one idle pin.

In an exemplary implementation mode, each of the third pin region and the fourth pin region further includes at least one first grounding pin and at least one second grounding pin, wherein the first grounding pin is connected with a first grounding line, and the second grounding pin is connected with a second grounding line; and the at least one idle pin is arranged between the first grounding pin and the touch signal output pins, and/or, the at least one idle pin is arranged between the touch signal output pins.

In an exemplary implementation mode, each of the fifth pin region and the sixth pin region further includes multiple touch signal input pins and at least one idle pin, and touch input lines are connected with the touch signal input pins and are not connected with the at least one idle pin.

In an exemplary implementation mode, the at least one idle pin is arranged between touch signal output pins and the touch signal input pins.

In another aspect, an exemplary embodiment of the present disclosure provides a touch panel, including a touch region and a bonding region, wherein the bonding region includes: a chip region, including a first edge, a second edge, a third edge, and a fourth edge, multiple pins located in the chip region and including multiple touch pins, wherein the multiple touch pins are arranged along the third edge and the fourth edge, and the multiple display pins are configured to be connected with display signal lines; multiple touch electrodes located in the touch region; and multiple touch signal lines, located in the touch region and the bonding region, wherein the multiple touch signal lines are correspondingly connected with the multiple touch electrodes and the multiple touch pins; wherein the chip region includes a first pin region, a second pin region, a third pin region, a fourth pin region, a fifth pin region, and a sixth pin region, the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region; and the multiple touch pins includes multiple touch signal output pins and multiple touch signal input pins, the multiple touch signal output pins are arranged in the third pin region and the fourth pin region, and the multiple touch signal input pins are arranged in the fifth pin region and the sixth pin region; and the touch signal output pins are configured to be connected with the touch signal lines, the touch signal input pins are configured to be connected with touch input lines, and touch signals are output to the touch signal output pins through the touch input lines and the touch signal input pins.

In another aspect, an exemplary embodiment of the present disclosure further provides a display apparatus, including the above-mentioned touch panel.

In yet another aspect, an exemplary embodiment of the present disclosure further provides a method for preparing a touch panel, including: forming a touch region and a bonding region, wherein the bonding region includes: a chip region, including a first edge, a second edge, a third edge, and a fourth edge; multiple pins located in the chip region and including multiple touch pins, wherein the multiple touch pins are arranged along the third edge and the fourth edge; multiple touch electrodes located in the touch region; and multiple touch signal lines located in the touch region and the bonding region, wherein the multiple touch signal lines are correspondingly connected with the multiple touch electrodes and the multiple touch pins; wherein the chip region includes a first pin region, a second pin region, a third pin region, a fourth pin region, a fifth pin region, and a sixth pin region, the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region; and the multiple touch pins includes multiple touch signal output pins and multiple touch signal input pins, the multiple touch signal output pins are arranged in the third pin region and the fourth pin region, and the multiple touch signal input pins are arranged in the fifth pin region and the sixth pin region; and the touch signal output pins are configured to be connected with the touch signal lines, the touch signal input pins are configured to be connected with touch input lines, and touch signals are output to the touch signal output pins through the touch input lines and the touch signal input pins.

Other aspects may be comprehended upon reading and understanding the drawings and detailed descriptions.

BRIEF DESCRIPTION OF THE DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, and are only intended to schematically illustrate contents of the present disclosure.

FIGS. 8-1 to 8-5 are schematic diagrams of structures of several metal meshes.

DETAILED DESCRIPTION

Figure 1:
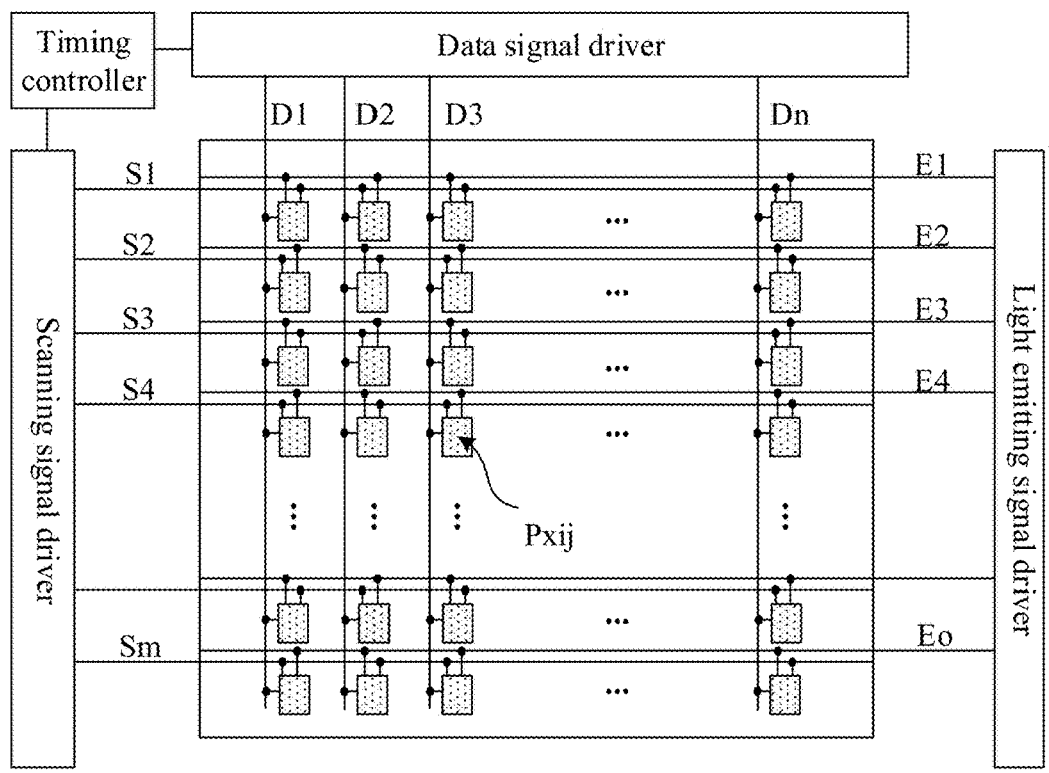
FIG. 1 is a schematic diagram of a structure of an Organic Light Emitting Diode (OLED) display apparatus.

The embodiments of the present disclosure will be described in detail below with reference to the drawings. It is to be noted that implementation modes may be implemented in multiple different forms. Those of ordinary skills in the art may easily understand such a fact that implementation modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to conventional designs.

In the drawings, a size of each constituent element, and a thickness of a layer or a region are exaggerated sometimes for clarity. Therefore, one implementation mode of the present disclosure is not necessarily limited to the size, and shapes and sizes of various components in the drawings do not reflect actual scales. In addition, the drawings schematically illustrate ideal examples, and one implementation mode of the present disclosure is not limited to the shapes, numerical values, or the like shown in the drawings.

Ordinal numerals such as "first", "second", "third", 1st, 2nd, and 3rd in the specification are not set to form limits in number but only to avoid confusion between constituent elements.

In the specification, for convenience, wordings indicating directional or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions according to which the constituent elements are described. Therefore, appropriate replacements can be made according to situations without being limited to the expressions described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the specification, a transistor refers to an element that at least includes three terminals, i.e., a gate electrode, a drain electrode, and a source electrode. A transistor has a channel region between a drain electrode (drain electrode terminal, drain region, or drain electrode) and a source electrode (source electrode terminal, source region, or source electrode), and a current can flow through the drain electrode, the channel region, and the source region. It is to be noted that, in the specification, the channel region refers to a region that the current mainly flows through.

In the specification, a first electrode may be the drain electrode, and a second electrode may be the source electrode. Or, the first electrode may be the source electrode, and the second electrode may be the drain electrode. In a case that transistors with opposite polarities are used, or a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

Structures of capacitive On Cell type touch panels are mainly divided into a mutual capacitance structure and a self-capacitance structure. The mutual capacitance structure refers to forming mutual capacitance by overlapping a driving electrode and a sensing electrode and performing position detection based on a change of the mutual capacitance. The self-capacitance structure refers to forming self-capacitance by a touch electrode and a human body and performing position detection based on a change of the self-capacitance. A self-capacitance touch panel has a single-layer structure, and has characteristics of low power consumption, and simple structure, etc. A mutual capacitance touch panel is has multi-layer structure, and has characteristics of multi-point touch, etc.

A display apparatus of an exemplary embodiment of the present disclosure may include a display substrate or display backplane arranged on a base substrate and a touch panel arranged on the display substrate. The display substrate or display backplane may be a Liquid Crystal Display (LCD) substrate, or an Organic Light Emitting Diode (OLED) display substrate, or a Plasma Display Panel (PDP) display substrate, or an Electrophoretic Display (EPD) substrate. In an exemplary implementation mode, the display substrate is an Organic Light Emitting Diode (OLED for short) display substrate, and as an active emitting display apparatus, an OLED has advantages of self-illumination, wide viewing angle, high contrast, low power consumption, very high response speed, etc. With constant development of display technologies, a flexible display using an OLED as a light emitting device and performing signal control by use of a Thin Film Transistor (TFT for short) has become a mainstream product in the field of display at present.

The OLED display substrate may include a base substrate, a driving circuit layer arranged on the base substrate, a light emitting structure layer arranged on the driving structure layer, and an encapsulation layer arranged on the light emitting structure layer. The touch panel is arranged on the encapsulation layer of the display substrate, so as to form a Touch on Thin Film Encapsulation (Touch on TFE for short) structure. Integrating a display structure and a touch structure may achieve advantages of lightness, thinness, and foldability, etc., and meet product requirements for flexible folding, and narrow bezel, etc.

At present, a Touch on TFE structure mainly includes a Flexible Multi Layer On Cell (FMLOC for short) structure and a Flexible Single Layer On Cell (FSLOC for short) structure. The FMLOC structure is based on a working principle of mutual capacitance detection, wherein a driving (Tx) electrode and a sensing (Rx) electrode are generally formed by using two layers of metal, and an Integrated Circuit (IC) achieves a touch action by detecting mutual capacitance between the driving electrode and the sensing electrode. The FSLOC structure is based on a working principle of self-capacitance (or voltage) detection, wherein a touch electrode is generally formed by using a single-layer metal, and an integrated circuit achieves a touch action by detecting self-capacitance (or voltage) of the touch electrode.

FIG. 1 is a schematic diagram of a structure of an OLED display apparatus. As shown in FIG. 1, the OLED display apparatus may include a timing controller, a data signal driver, a scanning signal driver, a light emitting signal driver, and a pixel array, wherein the pixel array may include multiple scanning signal lines (S1 to Sm), multiple data signal lines (D1 to Dn), multiple light emitting signal lines (E1 to En), and multiple sub-pixels Pxij. In an exemplary implementation mode, the timing controller may provide a gray-scale value and a control signal suitable for a specification of the data signal driver to the data signal driver, provide a clock signal, a scan starting signal, etc., suitable for a specification of the scanning signal driver to the scanning signal driver, and provide a clock signal, an emission stopping signal, etc., suitable for a specification of the light emitting signal driver to the light emitting signal driver. The data signal driver may generate a data voltage to be provided to the data signal lines D1, D2, D3, . . . , and Dn using the gray-scale value and the control signal that are received from the timing controller. For example, the data signal driver may sample the gray-scale value using the clock signal and apply a data voltage corresponding to the gray-scale value to the data signal lines D1 to Dn by taking a pixel row as a unit, wherein n may be a natural number. The scanning signal driver may receive the clock signal, the scan starting signal, etc., from the timing controller to generate a scanning signal to be provided to the scanning signal lines S1, S2, S3, . . . , and Sm. For example, the scanning signal driver may sequentially provide a scanning signal with an on-level pulse to the scanning signal lines S1 to Sm. For example, the scanning signal driver may be constructed in a form of a shift register to generate a scanning signal in a manner of sequentially transmitting the scan starting signal provided in a form of an on-level pulse to a next-stage circuit under control of the clock signal, wherein m may be a natural number. The light emitting signal driver may receive the clock signal, the emission stopping signal, etc., from the timing controller to generate an emission signal to be provided to the light emitting signal lines E1, E2, E3, . . . , and Eo. For example, the light emitting signal driver may sequentially provide an emission with an off-level pulse to the light emitting signal lines E1 to Eo. For example, the light emitting signal driver may be constructed in a form of a shift register to generate a light emitting signal in a manner of sequentially transmitting the emission stopping signal provided in a form of an off-level pulse to a next-stage circuit under control of the clock signal, wherein o may be a natural number. The pixel array may include multiple sub-pixels Pxij, and at least one of the sub-pixels Pxij may include a pixel driving circuit and a light emitting device, wherein the pixel driving circuit may be connected to a corresponding data signal line, a corresponding scanning signal line, and a corresponding light emitting signal line. The pixel driving circuit is configured to, under control of the scanning signal line and the light emitting signal line, receive a data voltage transmitted by the data signal line and output a corresponding current to the light emitting device, and the light emitting device is configured to emit light with corresponding brightness in response to the current output by the pixel driving circuit of a sub-pixel where the light emitting device is located, wherein i and j may be natural numbers. A sub-pixel Pxij may refer to a sub-pixel whose pixel driving circuit is connected to an i-th scanning signal line and a j-th data signal line.

Figure 2:
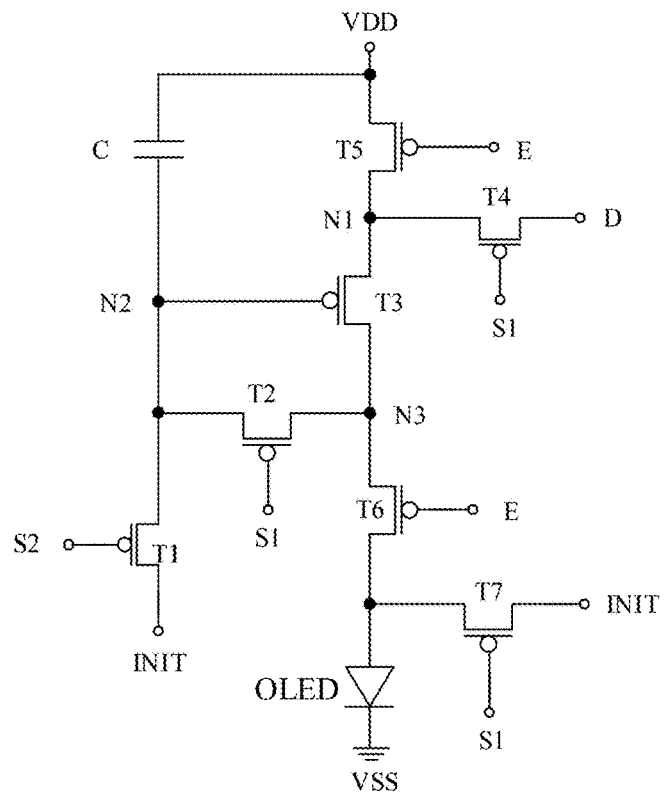
FIG. 2 is a schematic diagram of an equivalent circuit of a pixel driving circuit.

In an exemplary implementation mode, the pixel driving circuit may be in a 3T1C, 4T1C, 5T1C, 5T2C, 6T1C, or 7T1C structure. FIG. 2 is a schematic diagram of an equivalent circuit of a pixel driving circuit. As shown in FIG. 2, the pixel driving circuit may include seven transistors (a first transistor T1 to a seventh transistor T7), one storage capacitor C, and seven signal lines (a data signal line D, a first scanning signal line S1, a second scanning signal line S2, a light emitting signal line E, an initial signal line INIT, a first power supply line VDD, and a second power supply line VSS).

In an exemplary implementation mode, a first terminal of the storage capacitor C is connected with the first power supply line VDD, and a second terminal of the storage capacitor C is connected with a second node N2, namely the second terminal of the storage capacitor C is connected with a control electrode of the third transistor T3.

A control electrode of the first transistor T1 is connected with the second scanning signal line S2, a first electrode of the first transistor T1 is connected with the initial signal line INIT, and a second electrode of the first transistor is connected with the second node N2. When a scanning signal with an on-level is applied to the second scanning signal line S2, the first transistor T1 transmits an initialization voltage to the control electrode of the third transistor T3 so as to initialize a charge amount of the control electrode of the third transistor T3.

A control electrode of the second transistor T2 is connected with the first scanning signal line S1, a first electrode of the second transistor T2 is connected with the second node N2, and a second electrode of the second transistor T2 is connected with a third node N3. When a scanning signal with an on-level is applied to the first scanning signal line S1, the second transistor T2 enables the control electrode of the third transistor T3 to be connected with the second electrode thereof.

The control electrode of the third transistor T3 is connected with the second node N2, namely the control electrode of the third transistor T3 is connected with the second terminal of the storage capacitor C, a first electrode of the third transistor T3 is connected with a first node N1, and a second electrode of the third transistor T3 is connected with the third node N3. The third transistor T3 may be referred to as a driving transistor, and the third transistor T3 determines an amount of a driving current flowing between the first power supply line VDD and the second power supply line VSS according to a potential difference between the control electrode and the first electrode of the third transistor T3.

A control electrode of the fourth transistor T4 is connected with the first scanning signal line S1, a first electrode of the fourth transistor T4 is connected with the data signal line D, and a second electrode of the fourth transistor T4 is connected with the first node N1. The fourth transistor T4 may be referred to as a switch transistor, a scanning transistor, etc., and when a scanning signal with an on-level is applied to the first scanning signal line S1, the fourth transistor T4 enables a data voltage of the data signal line D to be input to the pixel driving circuit.

A control electrode of the fifth transistor T5 is connected with the light emitting signal line E, a first electrode of the fifth transistor T5 is connected with the first power supply line VDD, and a second electrode of the fifth transistor T5 is connected with the first node N1. A control electrode of the sixth transistor T6 is connected with the light emitting signal line E, a first electrode of the sixth transistor T6 is connected with the third node N3, and a second electrode of the sixth transistor T6 is connected with a first electrode of the light emitting device. The fifth transistor T5 and the sixth transistor T6 may be referred to as light emitting transistors. When a light emitting signal with an on-level is applied to the light emitting signal line E, the fifth transistor T5 and the sixth transistor T6 form a driving current path between the first power supply line VDD and the second power supply line VSS to enable the light emitting device to emit light.

A control electrode of the seventh transistor T7 is connected with the first scanning signal line S1, a first electrode of the seventh transistor T7 is connected with the initial signal line INIT, and a second electrode of the seventh transistor T7 is connected with the first electrode of the light emitting device. When a scanning signal with an on-level is applied to the first scanning signal line S1, the seventh transistor T7 transmits an initialization voltage to the first electrode of the light emitting device so as to initialize a charge amount accumulated in the first electrode of the light emitting device or release a charge amount accumulated in the first electrode of the light emitting device.

In an exemplary implementation mode, a second electrode of the light emitting device is connected with the second power supply line VSS, a signal of the second power supply line VSS is a low-level signal, and a signal of the first power supply line VDD is a high-level signal continuously provided. The first scanning signal line S1 is a scanning signal line in the pixel driving circuit of a current display row, and the second scanning signal line S2 is a scanning signal line in the pixel driving circuit of a previous display row. That is, for an n-th display row, the first scanning signal line S1 is S(n), and the second scanning signal line S2 is S(n−1). The second scanning signal line S2 of the current display row and the first scanning signal line S1 in the pixel driving circuit of the previous display row are a same signal line, which may reduce signal lines of a display panel and achieve a narrow bezel of the display panel.

In an exemplary implementation mode, the first transistor T1 to the seventh transistor T7 may be P-type transistors or N-type transistors. Use of the same type of transistors in a pixel driving circuit may simplify a process flow, reduce process difficulties of a display panel, and improve a yield of a product. In some possible implementation modes, the first transistor T1 to the seventh transistor T7 may include P-type transistors and N-type transistors.

In an exemplary implementation mode, the first scanning signal line S1, the second scanning signal line S2, the light emitting signal line E, and the initial signal line INIT extend in a horizontal direction, and the second power supply line VSS, the first power supply line VDD, and the data signal line D extend in a vertical direction.

In an exemplary implementation mode, the light emitting device may be an Organic Light Emitting Diode (OLED), including a first electrode (anode), an organic light emitting layer, and a second electrode (cathode) that are stacked.

Figure 3:
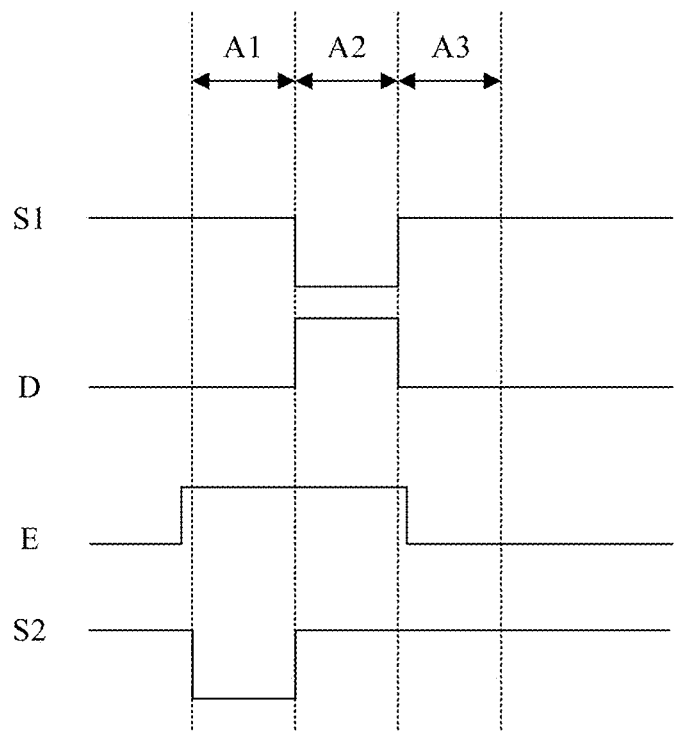
FIG. 3 is an operation timing diagram of a pixel driving circuit.

FIG. 3 is an operation timing diagram of a pixel driving circuit. An exemplary embodiment of the present disclosure will be described below through a working process of the pixel driving circuit shown in FIG. 2. The pixel driving circuit in FIG. 2 includes seven transistors (a first transistor T1 to a seventh transistor T7), one storage capacitor C, and seven signal lines (a data signal line D, a first scanning signal line S1, a second scanning signal line S2, a light emitting signal line E, an initial signal line INIT, a first power supply line VDD, and a second power supply line VSS), wherein all of the seven transistors are P-type transistors.

In an exemplary implementation mode, the working process of the pixel driving circuit may include following stages.

In a first stage A1, referred to as a reset stage, a signal of the second scanning signal line S2 is a low-level signal, and signals of the first scanning signal line S1 and the light emitting signal line E are high-level signals. The signal of the second scanning signal line S2 is the low-level signal, so that the first transistor T1 is turned on, and a signal of the initial signal line INIT is provided to the second node N2 to initialize the storage capacitor C to clear an original data voltage in the storage capacitor. The signals of the first scanning signal line S1 and the light emitting signal line E are high-level signals, so that the second transistor T2, the fourth transistor T4, the fifth transistor T5, the sixth transistor T6, and the seventh transistor T7 are turned off. An OLED does not emit light in this stage.

In a second stage A2, referred to as a data writing stage or a threshold compensation stage, a signal of the first scanning signal line S1 is a low-level signal, the signals of the second scanning signal line S2 and the light emitting signal line E are high-level signals, and the data signal line D outputs a data voltage. In this stage, a second terminal of the storage capacitor C is at a low level, so that the third transistor T3 is turned on. The signal of the first scanning signal line S1 is the low-level signal, so that the second transistor T2, the fourth transistor T4, and the seventh transistor T7 are turned on. The second transistor T2 and the fourth transistor T4 are turned on, so that the data voltage output by the data signal line D is provided to the second node N2 through the first node N1, the turned-on third transistor T3, the third node N3, and the turned-on second transistor T2, and the storage capacitor C is charged with a difference between the data voltage output by the data signal line D and a threshold voltage of the third transistor T3. A voltage at a second terminal (the second node N2) of the storage capacitor C is Vd−|Vth|, wherein Vd is the data voltage output by the data signal line D, and Vth is the threshold voltage of the third transistor T3. The seventh transistor T7 is turned on, so that an initialization voltage of the initial signal line INIT is provided to a first electrode of the OLED to initialize (reset) the first electrode of the OLED and clear a pre-stored voltage therein, thereby completing initialization to ensure that the OLED does not emit light. The signal of the second scanning signal line S2 is a high-level signal, so that the first transistor T1 is turned off. The signal of the light emitting signal line E is a high-level signal, so that the fifth transistor T5 and the sixth transistor T6 are turned off.

In a third stage A3, referred to as a light emitting stage, The signal of the light emitting signal line E is a low-level signal, and signals of the first scanning signal line S1 and the second scanning signal line S2 are high-level signals. The signal of the light emitting signal line E is the low-level signal, so that the fifth transistor T5 and the sixth transistor T6 are turned on, and a power voltage output by the first power supply line VDD provides a driving voltage to the first electrode of the OLED through the turned-on fifth transistor T5, the third transistor T3, and the sixth transistor T6 to drive the OLED to emit light.

In a driving process of the pixel driving circuit, a driving current flowing through the third transistor T3 (driving transistor) is determined by a voltage difference between a gate electrode and a first electrode of the third transistor T3. A voltage of the second node N2 is Vdata−|Vth|, so that the driving current of the third transistor T3 is as follows.

$$I = K*(Vgs - Vth)^2 = K*[(Vdd - Vd + |Vth|) - Vth]^2 =$$
$$K*[(Vdd - Vd)]^2$$

I is the driving current flowing through the third transistor T3, i.e., a driving current for driving the OLED, K is a constant, Vgs is the voltage difference between the gate electrode and first electrode of the third transistor T3, Vth is the threshold voltage of the third transistor T3, Vd is the data voltage output by the data signal line D, and Vdd is the power voltage output by the first power supply line VDD.

Figure 4:
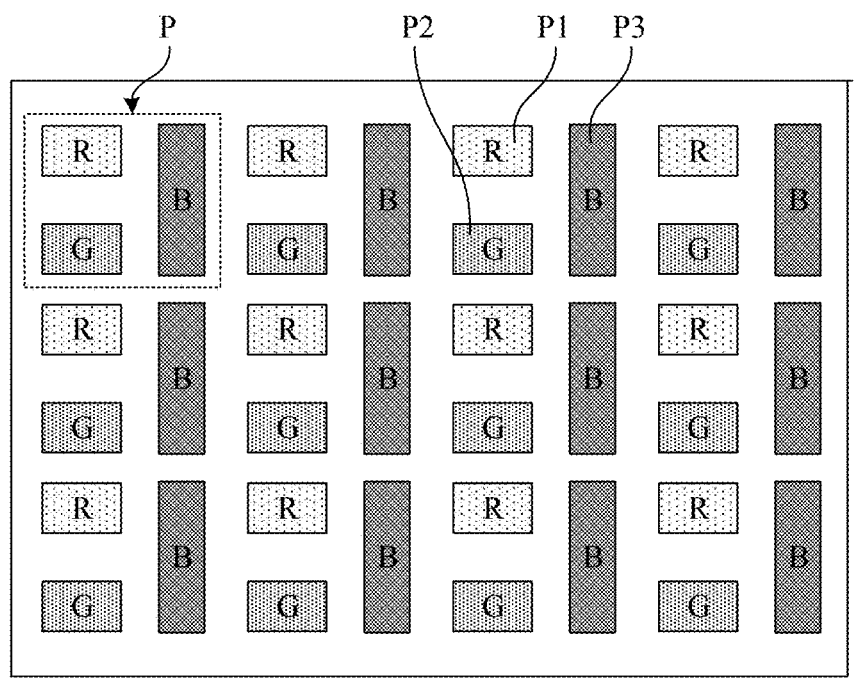
FIG. 4 is a schematic diagram of a planar structure of a display substrate according to an exemplary embodiment of the present disclosure.

FIG. 4 is a schematic diagram of a planar structure of a display substrate according to an exemplary embodiment of the present disclosure. As shown in FIG. 4, the display substrate may include multiple pixel units P arranged in a matrix, wherein at least one of the pixel units P may include a first sub-pixel P1 emitting light with a first color, a second sub-pixel P2 emitting light with a second color, and a third sub-pixel P3 emitting light with a third color. Each of the first sub-pixel P1, the second sub-pixel P2, and the third sub-pixel P3 includes a pixel driving circuit and a light emitting device. The pixel driving circuit in the sub-pixel is connected with a scanning signal line, a data signal line, and a light emitting signal line respectively, the light emitting device in the sub-pixel is connected with the pixel driving circuit of the sub-pixel where the light emitting device is located. The pixel driving circuit is configured to, under control of the scanning signal line and the light emitting signal line, receive a data voltage transmitted by the data signal line and output a corresponding current to the light emitting device, and the light emitting device is configured to emit light with a corresponding brightness in response to the current output by the pixel driving circuit of the sub-pixel where the light emitting device is located.

In an exemplary implementation mode, the first sub-pixel P1 may be a Red (R) sub-pixel, the second sub-pixel P2 may be a Green (G) sub-pixel, the third sub-pixel P3 may be a Blue (B) sub-pixel, the three sub-pixels are arranged in a delta shape. The rectangular R sub-pixel and the rectangular G sub-pixel are located on one side of a pixel unit, while the rectangular B sub-pixel is located on the other side of the pixel unit, and an area of the B sub-pixel may approximately be a sum of areas of the R sub-pixel and the G sub-pixel. In an exemplary implementation mode, a shape of a sub-pixel may be any one or more of a triangle, a square, a rectangle, a rhombus, a trapezoid, a parallelogram, a pentagon, a hexagon, and another polygon, multiple sub-pixels may be arranged in parallel in a horizontal direction, in parallel in a vertical direction, in a shape of an X, in a shape of a cross, or in a delta shape, etc., which is not limited in the present disclosure.

In an exemplary implementation mode, the pixel unit P may include four sub-pixels, such as a red sub-pixel, a green sub-pixel, a blue sub-pixel, and a white sub-pixel, wherein the four sub-pixels may be arranged in parallel in a horizontal direction, in parallel in a vertical direction, or in a square form, which is not limited in the present disclosure.

Figure 5:
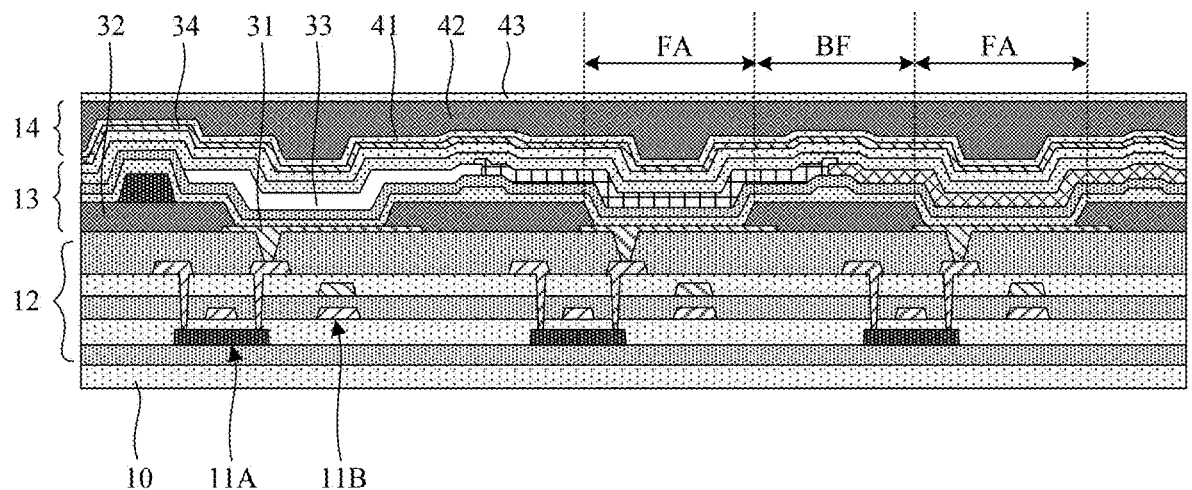
FIG. 5 is a schematic sectional view of a display substrate according to an exemplary embodiment of the present disclosure.

FIG. 5 is a schematic sectional view of a display substrate according to an exemplary embodiment of the present disclosure, and illustrates a structure of three sub-pixels of an OLED display substrate. As shown in FIG. 5, on a plane perpendicular to the display substrate, the display substrate may include a driving circuit layer 12 arranged on a base substrate 10, a light emitting structure layer 13 arranged on a side of the driving circuit layer 12 away from the base substrate 10, and an encapsulation layer 14 arranged on a side of the light emitting structure layer 13 away from the base substrate 10. In some possible implementation modes, the display substrate may include another film layer, such as spacer posts, which is not limited in the present disclosure.

In an exemplary implementation mode, the base substrate 10 may be a flexible base substrate or a rigid base substrate. A driving circuit layer 12 of each sub-pixel may include multiple transistors and a storage capacitor that form a pixel driving circuit. FIG. 5 shows only one transistor 11A and one storage capacitor 11B as an example. The light emitting structure layer 13 may include an anode 31, a pixel definition layer 32, an organic light emitting layer 33, and a cathode 34. The anode 31 is connected with a drain electrode of the transistor 11A through a via, the pixel definition layer 32 covers the anode 31 and is provided with a pixel opening exposing the anode 31. The organic light emitting layer 33 is connected with the anode 31 through the pixel opening, the cathode 34 is connected with the organic light emitting layer 33, and the organic light emitting layer 33 is driven by the anode 31 and the cathode 34 to emit light with a corresponding color. The encapsulation layer 14 may include a first encapsulation layer 41, a second encapsulation layer 42, and a third encapsulation layer 43 that are stacked, wherein the first encapsulation layer 41 and the third encapsulation layer 43 may be made of an inorganic material, the second encapsulation layer 42 may be made of an organic material, and the second encapsulation layer 42 is arranged between the first encapsulation layer 41 and the third encapsulation layer 43 so as to prevent external water vapor from entering the light emitting structure layer 13. In an exemplary implementation mode, a touch panel is arranged on a side of the third encapsulation layer 43 away from the base substrate.

In an exemplary implementation mode, a driving circuit layer of each sub-pixel may include a first insulation layer arranged on a flexible base substrate, an active layer arranged on the first insulation layer, a second insulation layer covering the active layer, a gate electrode and a first capacitor electrode arranged on the second insulation layer, a third insulation layer covering the gate electrode and the first capacitor electrode, a second capacitor electrode arranged on the third insulation layer, a fourth insulation layer which covers the second capacitor electrode and in which a via exposing the active layer is formed, a source electrode and a drain electrode which are arranged on the fourth insulation layer and connected with the active layer through the via respectively, and a planarization layer covering the above-mentioned structures. The active layer, the gate electrode, the source electrode, and the drain electrode form a transistor, and the first capacitor electrode and the second capacitor electrode form a storage capacitor. In an exemplary implementation mode, the active layer may be made of a material such as amorphous Indium Gallium Zinc Oxide (a-IGZO), zinc oxynitride (ZnON), indium zinc tin oxide (IZTO), amorphous silicon (a-Si), polysilicon (p-Si), sexithiophene, or polythiophene, namely the present disclosure is applied to a transistor manufactured based on an oxide technology, a silicon technology, or an organic matter technology.

In an exemplary implementation mode, the organic light emitting layer may include an Emitting Layer (EML), as well as any one or more of following layers: a Hole Injection Layer (HIL), a Hole Transport Layer (HTL), an Electron Block Layer (EBL), a Hole Block Layer (HBL), an Electron Transport Layer (ETL), and an Electron Injection Layer (EIL). In an exemplary implementation mode, hole injection layers of all sub-pixels may be connected together to form a common layer, electron injection layers of all the sub-pixels may be connected together to form a common layer, hole transport layers of all the sub-pixels may be connected together to form a common layer, electron transport layers of all the sub-pixels may be connected together to form a common layer, hole block layers of all the sub-pixels may be connected together to form a common layer, emitting layers of adjacent sub-pixels may be overlapped slightly or may be isolated from each other, and electron block layers of adjacent sub-pixels may be overlapped slightly or may be isolated from each other.

In an exemplary implementation mode, each sub-pixel in the display substrate may include a light emitting region and a non-light-emitting region. Since the organic light emitting layer emits light from a region of the pixel opening defined by the pixel definition layer, the region of the pixel opening is a light emitting region FA of the sub-pixel, and a region except the pixel opening is a non-light-emitting region BF of the sub-pixel, wherein the non-light-emitting region BF is located between light emitting regions FA of adjacent sub-pixels.

An exemplary embodiment of the present disclosure provides a touch panel. In an exemplary implementation mode, the touch panel may include a touch region and a bonding region located on a side of the touch region in a first direction. The bonding region may include:

a chip region, including a first edge, a second edge, a third edge, and a fourth edge, wherein the first edge and the second edge extend along a second direction, the second edge is located on a side of the first edge away from the touch region, and the third edge and the fourth edge extend along the first direction, wherein the first direction intersects with the second direction;

multiple pins located in the chip region and including multiple display pins and multiple touch pins, wherein the multiple display pins are arranged along the first edge and the second edge, the multiple touch pins are arranged along the third edge and the fourth edge, and the multiple display pins are configured to be connected with display signal lines;

multiple touch electrodes located in the touch region; and multiple touch signal lines located in the touch region and the bonding region, wherein the multiple touch signal lines are correspondingly connected with the multiple touch electrodes and the multiple touch pins.

In an exemplary implementation mode, the chip region includes a first pin region, a second pin region, a third pin region, a fourth pin region, a fifth pin region, and a sixth pin region, wherein the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region.

In an exemplary implementation mode, the multiple display pins include multiple display signal output pins and multiple display signal input pins, wherein the multiple display signal output pins are arranged in the first pin region, and the multiple display signal input pins are arranged in the second pin region. The multiple display signal output pins are configured to be connected with data signal lines, and the display signal input pins are configured to be connected with an external circuit board through display connection lines and a pin bonding region of the bonding region such that the external circuit board provides display signals through the pin bonding region, the display connection lines, and the display signal input pins.

In an exemplary implementation mode, the multiple touch pins include multiple touch signal output pins and multiple touch signal input pins, wherein the multiple touch signal output pins are arranged in the third pin region and the fourth pin region, and the multiple touch signal input pins are arranged in the fifth pin region and the sixth pin region. The touch signal output pins are configured to be connected with the touch signal lines, the touch signal input pins are configured to be connected with touch input lines, and touch signals are output to the touch signal output pins through the touch input lines and the touch signal input pins.

In an exemplary implementation mode, a multi-row staggered arrangement structure is used for multiple pins in at least one of the first pin region, the second pin region, the third pin region, the fourth pin region, the fifth pin region, and the sixth pin region.

Figure 6:
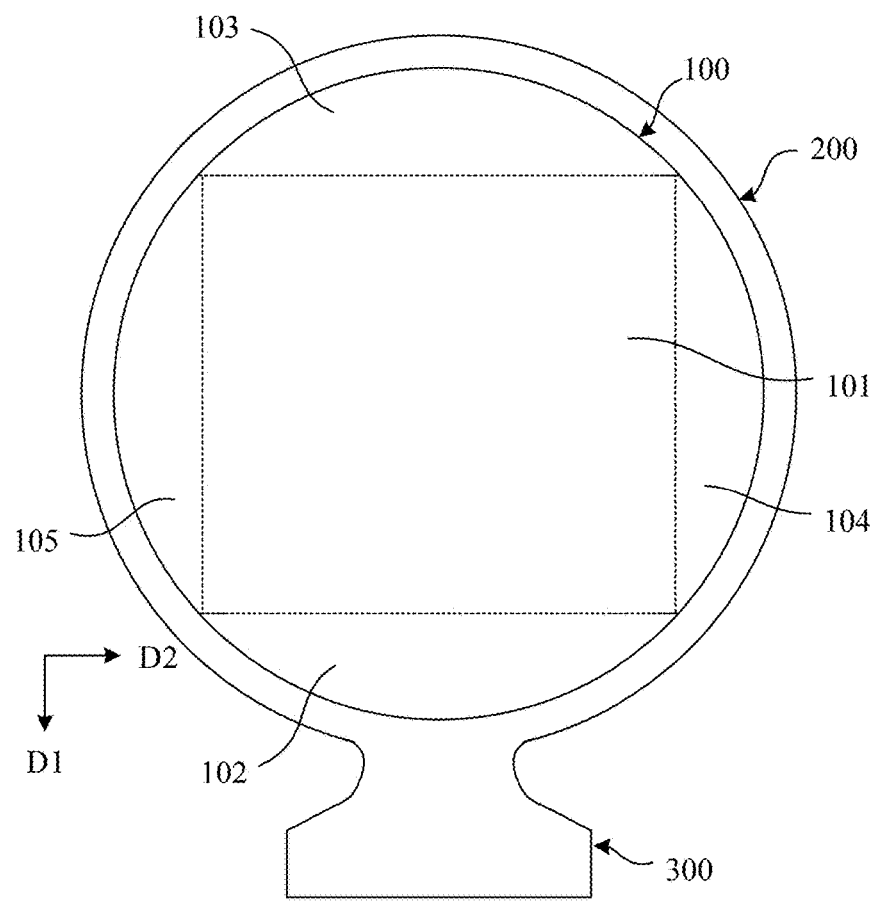
FIG. 6 is a schematic diagram of a structure of a touch panel according to an exemplary embodiment of the present disclosure.

FIG. 6 is a schematic diagram of a structure of a touch panel according to an exemplary embodiment of the present disclosure. As shown in FIG. 6, in a plane parallel to the touch panel, the touch panel includes a touch region 100, a bonding region 300 located on a side of the touch region 100 in a first direction D1, and a bezel region 200 located on another side of the touch region 100. In an exemplary implementation mode, a shape of the touch region 100 may be a circle, the circular touch region 100 is provided with multiple touch electrodes, a shape of the bezel region 200 may be a ring surrounding the touch region 100, the ring-shaped bezel region 200 is provided with multiple signal leads. A first end of at least one of the signal leads is connected with at least one touch electrode in the touch region 100, a second end of the signal lead extends to the bonding region 300 along a shape of a bezel, a shape of the bezel region 300 may be a rectangle, and the bonding region 300 is configured to connect the multiple signal leads with an external control apparatus.

As shown in FIG. 6, the circular touch region 100 may be divided into multiple electrode regions. In an exemplary implementation mode, the multiple electrode regions may include a first electrode region 101 located in middle of the touch region 100, a second electrode region 102 located on a side (lower side) of the first electrode region 101 in the first direction D1, a third electrode region 103 located on a side (upper side) of the first electrode region 101 in a direction opposite to the first direction D1, a fourth electrode region 104 located on a side (right side) of the first electrode region 101 in a second direction D2, and a fifth electrode region 105 located on a side (left side) of the first electrode region 101 in a direction opposite to the second direction D2. In an exemplary implementation mode, a shape of the first electrode region 101 may be a rectangle that may be internally tangent to the circle defining the touch region, and the rectangular first electrode region 101 is configured to be provided with multiple touch electrodes in a matrix arrangement. In an exemplary implementation mode, a shape of each of the second electrode region 102, the third electrode region 103, the fourth electrode 104, and the fifth electrode region 105 may be a circular crown, and a circular-crown-shaped electrode region is configured to be provided with multiple touch electrodes sequentially according to the first direction D1 or the second direction D2.

Figure 7:
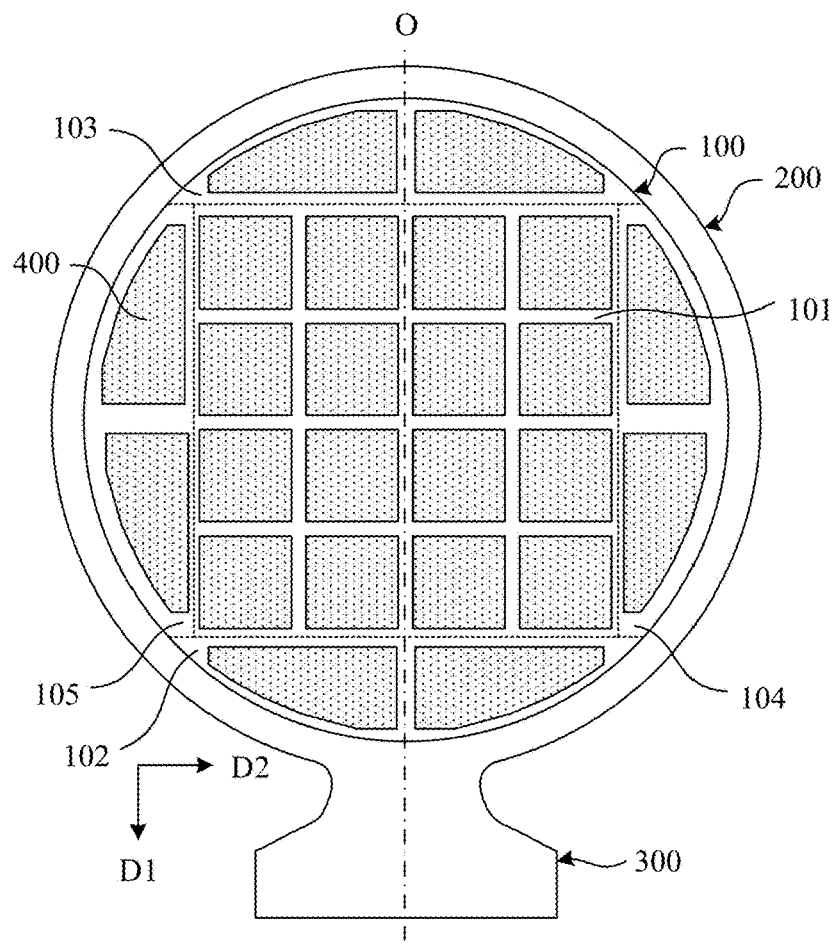
FIG. 7 is a schematic diagram of an arrangement of touch electrodes according to an exemplary embodiment of the present disclosure.

FIG. 7 is a schematic diagram of an arrangement of touch electrodes according to an exemplary embodiment of the present disclosure. A case that a touch region includes 24 self-capacitance touch electrodes is taken as an example. As shown in FIG. 7, in a plane parallel to the touch panel, a touch region 100 may include 24 touch electrodes 400 that are arranged regularly. In an exemplary implementation mode, a rectangular first electrode region 101 may include touch electrodes 400 of 4 rows*4 columns arranged in a matrix, wherein a shape of each of the touch electrodes 400 may be a rectangle, the 16 touch electrodes 400 may have the same area, and an area of each of the touch electrodes 400 is S. Each of a circular-crown-shaped second electrode region 102 and third electrode region 103 may include two touch electrodes 400, wherein the two touch electrodes 400 are sequentially arranged along a second direction D2, the two touch electrodes 400 in each electrode region may have the same area, and an area of a touch electrode 400 in the second electrode region 102 may be the same as that of a touch electrode 400 in the third electrode region 103. Each of a circular—crown-shaped fourth electrode region 104 and a circular—crown-shaped fifth electrode region 105 may include two touch electrodes 400, the two touch electrodes 400 are sequentially arranged along a first direction D1, two touch electrodes 400 in each electrode region may have the same area, and an area of a touch electrode 400 in the fourth electrode region 104 may be the same as that of a touch electrode 400 in the fifth electrode region 105.

In an exemplary implementation mode, an area of at least one touch electrode 400 in the second electrode region 102 and the third electrode region 103 may be about 1.5S to 1.6S. For example, an area of each touch electrode 400 in the second electrode region 102 and the third electrode region 103 may be about 1.55S.

In an exemplary implementation mode, an area of at least one touch electrode 400 in the fourth electrode region 104 and the fifth electrode region 105 may be about 1.47S to 1.57S. For example, an area of each touch electrode 400 in the fourth electrode region 104 and the fifth electrode region 105 may be about 1.52S.

In an exemplary implementation mode, the multiple touch electrodes 400 in the touch region 100 may be arranged symmetrically relative to a centerline O, wherein the centerline O may be a centerline extending along the first direction D1 and equally dividing the touch region.

In an exemplary implementation mode, each of the multiple touch electrodes 400 in the first electrode region 101 may be approximately a rectangular pattern of 4 mm*4 mm or 5 mm*5 mm. In some possible exemplary implementation modes, a shape of each of the multiple touch electrodes 400 in the first electrode region 101 may be a rhombus, a triangle, a polygon, or the like. During operation, a touch by a finger of a person will cause self-capacitance of a corresponding touch electrode to change, and an external control apparatus may determine a position of the finger according to a change of a capacitance of the touch electrode.

In an exemplary implementation mode, a touch electrode in the touch panel may be in a form of a metal mesh, wherein the metal mesh is formed by intersection of multiple metal wires, and includes multiple mesh patterns, wherein each mesh pattern is a polygon formed by multiple metal wires. The touch electrode in the form of the metal mesh has advantages of low resistance, small thickness, fast response speed, etc. In an exemplary implementation mode, a region formed by metal wires in a mesh pattern includes a light emitting region of a sub-pixel, and the metal wires are located in a non-light-emitting region between adjacent light emitting regions. For example, when a display substrate is an OLED display substrate, a light emitting region is a region of a pixel opening in a pixel definition layer, a non-light-emitting region is a region except the pixel opening, wherein an orthographic projection of the light emitting region on the display substrate is located within a range of an orthographic projection of the region formed by metal wires on the display substrate, and an orthographic projection of the metal wires on the display substrate is located within a range of an orthographic projection of the non-light-emitting region on the display substrate.

Figures 1, 8:
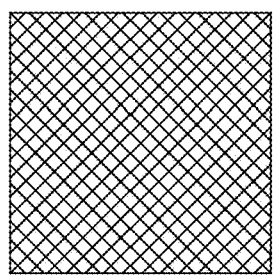
Figures 2, 8:
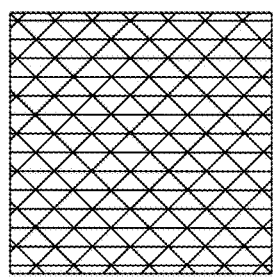
Figures 3, 8:
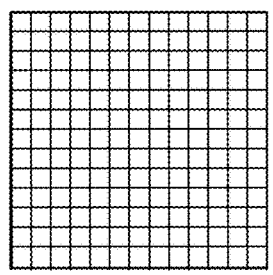
Figures 4, 8:
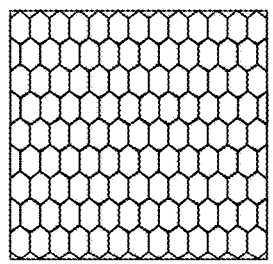
Figures 5, 8:
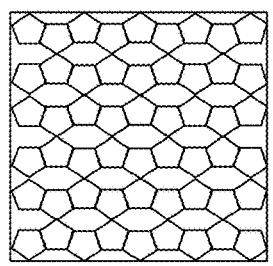

FIGS. 8-1 to 8-5 are schematic diagrams of structures of several metal meshes. A metal mesh includes multiple mesh patterns, wherein a mesh pattern is a polygon formed by metal wires, and the metal mesh is formed by splicing the multiple mesh patterns that are repeatedly and continuously arranged. In an exemplary implementation mode, a shape of a mesh pattern formed by metal wires may be a rhombus, as shown in FIG. 8-1. Or, a shape of a mesh pattern formed by metal wires may be a triangle, as shown in FIG. 8-2. Or, a shape of a mesh pattern formed by metal wires may be a rectangle, as shown in FIG. 8-3. Or, a shape of a mesh pattern formed by metal wires may be a hexagon, as shown in FIG. 8-4. Or, a shape of a mesh pattern formed by metal wires may be a combination of multiple shapes, such as a combination of a pentagon and a hexagon, as shown in FIG. 8-5. Or, a shape of a mesh pattern formed by metal wires may include any one or more of a triangle, a square, a rectangle, a rhombus, a trapezoid, a pentagon, and a hexagon. In some possible implementation modes, a mesh pattern formed by metal wires may be a regular or irregular shape, which is not limited in the present disclosure. In some possible implementation modes, a wire width of a metal wire is less than or equal to 5 μm.

Figure 9:
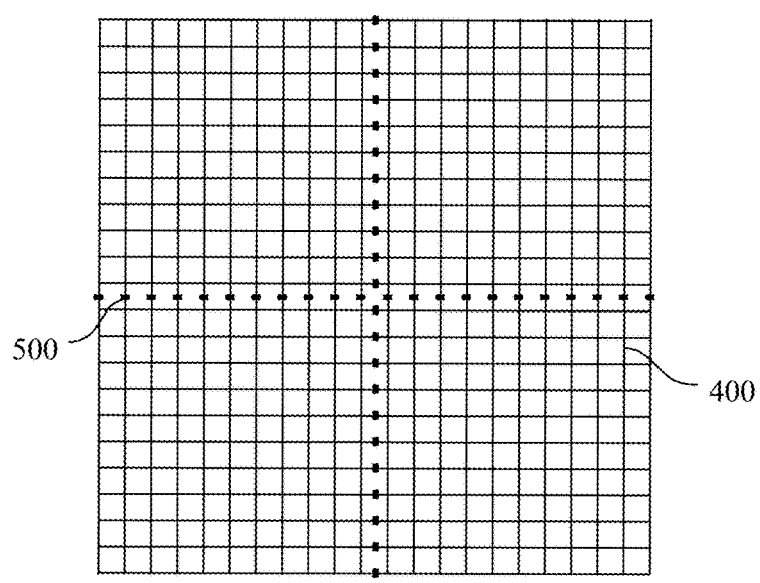
FIG. 9 is a schematic diagram of a structure of a touch electrode in a form of a metal mesh.

FIG. 9 is a schematic diagram of a structure of a touch electrode in a form of a metal mesh. A case that mesh patterns are rectangular is taken as example. As shown in FIG. 9, in order to form multiple mutually insulated touch electrodes in a touch region, multiple notches 500 are formed in the metal mesh, wherein the multiple notches 500 disconnect metal wires of mesh patterns so as to achieve isolation of mesh patterns of adjacent touch electrodes 400. In FIG. 9, a black block is used for representing a notch 500, and the notch 500 may be understood as an imaginary line for cutting a metal wire. In an exemplary implementation mode, the multiple notches 500 enable the metal mesh to form the touch region and a bezel region. Each mesh pattern in the bezel region is provided with a notch 500 and the notch 500 cuts off metal wires of the mesh pattern so that each mesh pattern is divided into two portions, wherein one portion belongs to a touch electrode 400 on one side, while the other portion belongs to a touch electrode 400 on the other side.

In an exemplary implementation mode, multiple notches (not shown) may be formed in the touch region, wherein the multiple notches form one or more dummy regions in the touch region.

Figure 10:
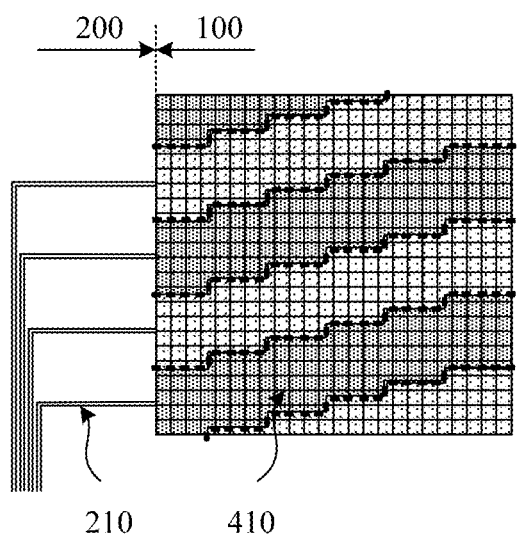
FIG. 10 is a schematic diagram of touch wirings in a touch panel.

FIG. 10 is a schematic diagram of touch wirings in a touch panel, and illustrates a structure of touch wirings in a junction region of a touch region 100 and a bezel region 200. A case that mesh patterns are rectangular is taken as an example. In an exemplary implementation mode, in order to form multiple mutually insulated touch wirings in the touch region 100, it may be achieved by arranging notches on a metal mesh. In an exemplary implementation mode, multiple notches are arranged on the mesh pattern. The multiple notches disconnect metal wires of the mesh pattern so as to achieve isolation of a mesh pattern of a touch wiring from a mesh pattern of another adjacent touch wiring. The notch may be understood as an imaginary line for cutting a metal wire. Multiple notches on multiple mesh patterns may form a signal transmission channel. As shown in FIG. 10, a black block represents a notch, and dark and light fillings represent touch wirings 410 defined by multiple notches respectively. In an exemplary implementation mode, a signal lead 210 in the bezel region 200 may be in a form of a metal wire, and multiple signal leads 210 in the bezel region 200 are correspondingly connected with multiple touch wirings 410 in the touch region 100.

Figure 11:
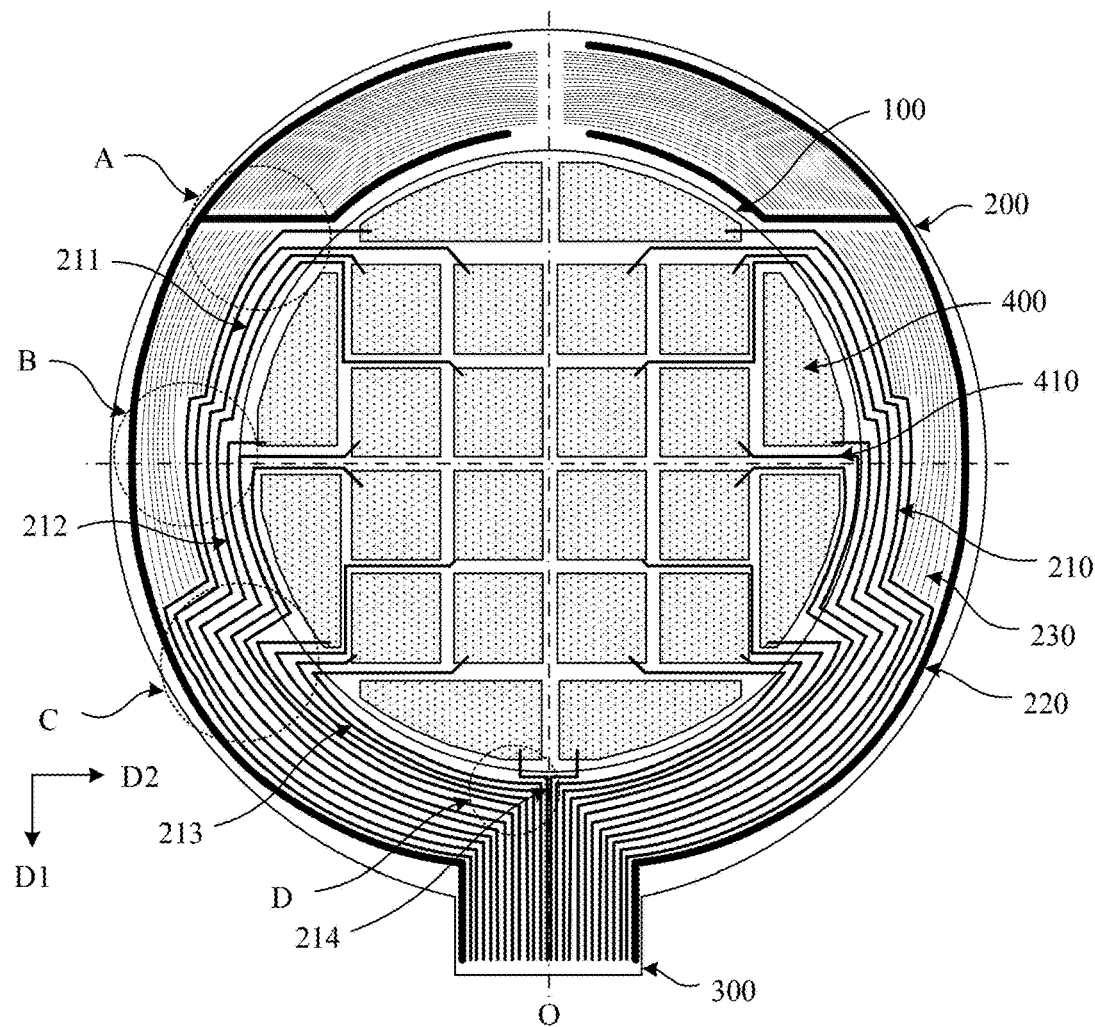
FIG. 11 is a schematic diagram of signal leads in a touch panel according to an exemplary embodiment of the present disclosure.

FIG. 11 is a schematic diagram of an arrangement of signal leads in a touch panel according to an exemplary embodiment of the present disclosure. A case that a touch region includes 24 self-capacitance touch electrodes is taken as an example. As shown in FIG. 11, the touch panel may include a touch region 100, a bezel region 200, and a bonding region 300, wherein the touch region 100 may include multiple touch electrodes 400 and multiple touch wirings 410, and the bezel region 200 may include multiple signal leads 210, grounding lines 220, and dummy line segments 230. In an exemplary implementation mode, the multiple touch electrodes 400 and the multiple touch wirings 410 in the touch region 100 are in a form of metal mesh patterns, and the multiple signal leads 210 and the grounding lines 220 in the bezel region 200 are in a form of metal wires.

In an exemplary implementation mode, the 24 touch electrodes 400 in the touch region 100 are arranged in six rows and six columns, and the 24 touch electrodes 400 may be arranged symmetrically relative to a centerline O. Positions of touch electrodes will be described below by taking 12 touch electrodes on a left side of the centerline O as an example.

In an exemplary implementation mode, no touch electrode is arranged in a region where a first row and a first column are located and a region where a sixth row and the first column are located. A first-row strip-shaped touch electrode extending along a second direction D2 is formed in a region where a second column and a third column of the first row are located. A sixth-row strip-shaped touch electrode extending along the second direction D2 is formed in a region where a second column and a third column of a sixth row are located. A second-third-row strip-shaped touch electrode extending along a first direction D1 is formed in a region where a second row and a third row of the first column are located. A fourth-fifth-row strip-shaped touch electrode extending along the first direction D1 is formed in a region where a fourth row and a fifth row of the first column are located. Eight block-shaped touch electrodes are formed in regions where a second column to a third column of a second row are located, regions where a second column to a third column of a third row are located, regions where a second column to a third column of a fourth row are located, and regions where a second column to a third column of a fifth row are located.

In an exemplary implementation mode, the 24 touch wirings 410 in the touch region 100 may be arranged between the touch electrodes 400, and the 24 touch wirings 410 may be arranged symmetrically relative to the centerline O. A first end of a touch wiring 410 is connected with a touch electrode 400, while a second end of the touch wiring 410 extends to the bezel region 200 to be connected with a first end of a signal lead 210 in the bezel region 200. Positions of the touch wirings will be described below by taking 12 touch wirings on a left side of the centerline O as an example.

In an exemplary implementation mode, the multiple touch wirings 410 may include a first group of wirings, a second group of wirings, a third group of wirings, and a fourth group of wirings, which are sequentially arranged along the first direction D1. The first group of wirings may include four touch wirings, wherein first ends of the four touch wirings are connected with the first-row strip-shaped touch electrode, a second-row second-column block-shaped touch electrode, a second-row third-column block-shaped touch electrode, and the third-row third-column block-shaped touch electrode respectively, and second ends of the four touch wirings extend to the bezel region 200. The second group of wirings may include three touch wirings, wherein first ends of the three touch wirings are connected with the second-third-row strip-shaped touch electrode, a third-row second-column block-shaped touch electrode, and a fourth-row second-column block-shaped touch electrode respectively, and second ends of the three touch wirings extend to the bezel region 200. The third group of wirings may include four touch wirings, wherein first ends of the four touch wirings are connected with the fourth-fifth-row strip-shaped touch electrode, the fourth-row third-column block-shaped touch electrode, the fifth-row second-column block-shaped touch electrode, and the fifth-row third-column block-shaped touch electrode respectively, and second ends of the four touch wirings extend to the bezel region 200. The fourth group of wirings may include one touch wiring, wherein a first end of the one touch wiring is connected with the sixth-row strip-shaped touch electrode, and a second end of the one touch wiring directly extends to the bonding region 300.

In an exemplary implementation mode, a first end of a signal lead 210 in the bezel region 200 is connected with a second end of a touch wiring 410 in the touch region 100, and a second end of the signal lead 210 extends to the bonding region 300 along a shape of a bezel. A first end of a grounding line 220 in the bezel region 200 is arranged on a side of the bezel region 200 away from the bonding region 300, and a second end of the grounding line 220 extends to the bonding region 300 along a shape of a bezel, and the grounding line 220 is arranged on a side of the signal lead 210 away from the touch region 100, and is configured to conduct static electricity generated by the touch panel out through a conduction loop.

In an exemplary implementation mode, the signal lead 210 and the grounding line 220 in the bezel region 200 may be arranged symmetrically relative to a centerline O. Positions of leads will be described below by taking leads on a left side of the centerline O as an example.

In an exemplary implementation mode, the multiple signal leads 210 may include a first group of leads 211, a second group of leads 212, a third group of leads 213, and a fourth group of leads 214, which are sequentially arranged along the first direction D1. The first group of leads 211 may include four signal leads, wherein first ends of the four signal leads are connected with the second ends of the four touch wirings in the first group of wirings respectively, while second ends of the four signal leads extend to the bonding region 300 along a shape of a bezel respectively. The second group of leads 212 may include three signal leads, wherein first ends of the three signal leads are connected with the second ends of the three touch wirings in the second group of wirings respectively, while second ends of the three signal leads extend to the bonding region 300 along the shape of the bezel respectively. The third group of leads 213 may include four signal leads, wherein first ends of the four signal leads are connected with the second ends of four touch wirings in the third group of wirings respectively, while second ends of the four signal leads extend to the bonding region 300 along a shape of the bezel respectively. The fourth group of leads 214 may include one signal lead, wherein a first end of the one signal lead is connected with the second end of the touch wiring in the fourth group of wirings, while a second end of the one signal lead extends to the bonding region 300.

Figure 12:
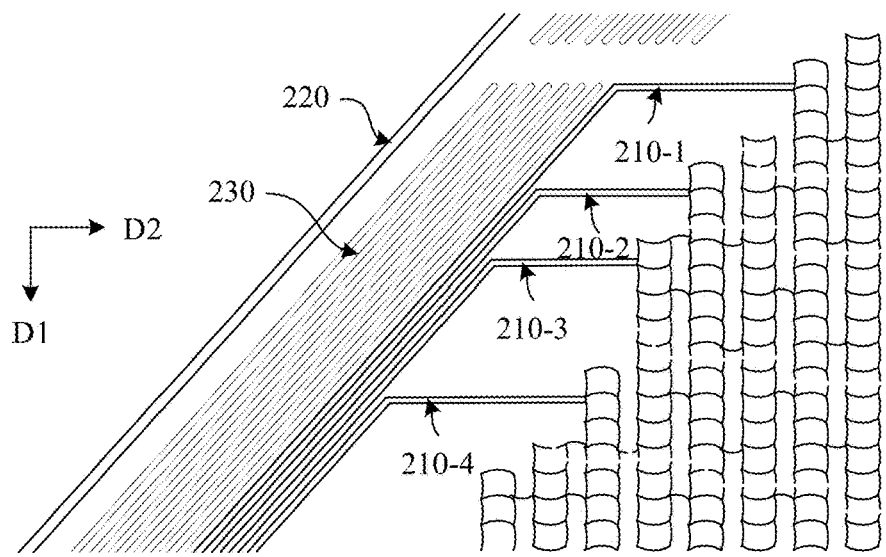
FIG. 12 is a schematic diagram of a first group of leads according to an exemplary embodiment of the present disclosure.

FIG. 12 is a schematic diagram of a first group of leads according to an exemplary embodiment of the present disclosure, and is an enlarged view of a region A in FIG. 11. As shown in FIG. 12, a first group of leads 211 may include a first signal lead 210-1, a second signal lead 210-2, a third signal lead 210-3, and a fourth signal lead 210-4. The four signal leads are connected with four touch wirings in a first group of wirings in a touch region respectively. In an exemplary implementation mode, each of the signal leads includes a leading-out section and an extension section, wherein a first end of the leading-out section is connected with a touch wiring connected with a touch electrode, while a second end of the leading-out section is connected with a first end of the extension section after extending along a direction opposite to a second direction D2, and a second end of the extension section extends to a bonding region along a shape of a bezel.

In an exemplary implementation mode, the first signal lead 210-1, the second signal lead 210-2, the third signal lead 210-3, and the fourth signal lead 210-4 form a nested lead structure, wherein the fourth signal lead 210-4 is embedded within the third signal lead 210-3, the third signal lead 210-3 is embedded within the second signal lead 210-2, and the second signal lead 210-2 is embedded within the first signal lead 210-1.

In an exemplary implementation mode, a first end of a grounding line 220 is arranged on a side of a bezel region away from the bonding region, while a second end of the grounding line 220 extends to the bonding region along the shape of the bezel. In an exemplary implementation mode, a grounding line 220 is arranged on a side of the first signal lead 210-1 away from the touch region.

In an exemplary implementation mode, multiple dummy line segments 230 may be arranged in the bezel region, wherein the multiple dummy line segments 230 may be arranged between an extension section of a first signal lead 210-1 and a grounding line 220. The multiple dummy line segments 230 are sequentially arranged along a direction away from the touch region, and each of the dummy line segments 230 extends along the shape of the bezel.

Figure 13:
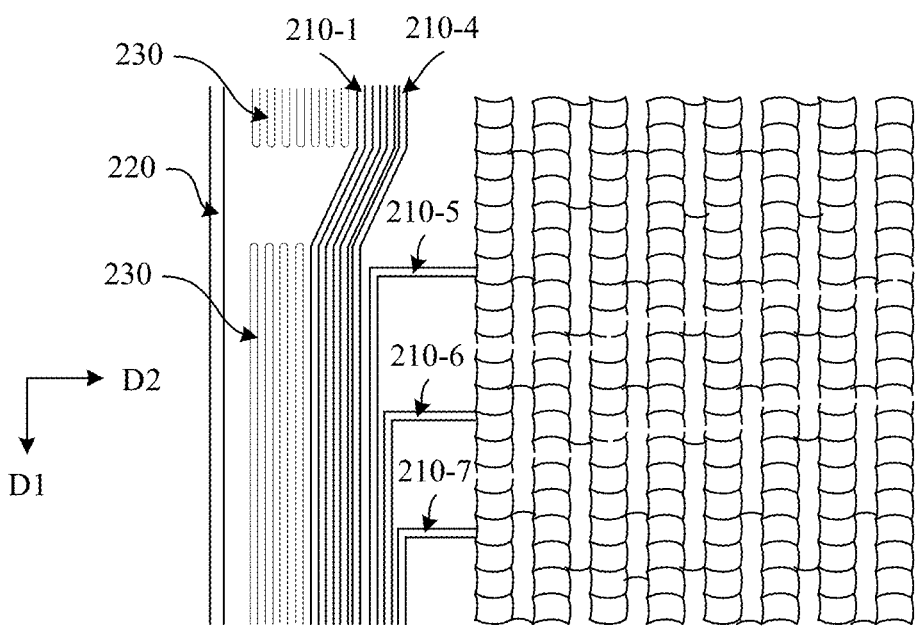
FIG. 13 is a schematic diagram of a second group of leads according to an exemplary embodiment of the present disclosure.

FIG. 13 is a schematic diagram of a second group of leads according to an exemplary embodiment of the present disclosure, and is an enlarged view of a region B in FIG. 11. As shown in FIG. 13, the second group of leads 212 may include a fifth signal lead 210-5, a sixth signal lead 210-6, and a seventh signal lead 210-7, wherein the three signal leads are connected with three touch wirings in a second group of wirings in a touch region respectively. In an exemplary implementation mode, each of the signal leads includes a leading-out section and an extension section. A first end of the leading-out section is connected with a touch wiring connected with a touch electrode, while a second end of the leading-out section is connected with a first end of the extension section after extending along a direction opposite to a second direction D2, and a second end of the extension section extends to a bonding region along a shape of a bezel.

In an exemplary implementation mode, the fifth signal lead 210-5, the sixth signal lead 210-6, and the seventh signal lead 210-7 form a nested lead structure, wherein the seventh signal lead 210-7 is embedded within the sixth signal lead 210-6, and the sixth signal lead 210-6 is embedded within the fifth signal lead 210-5.

In an exemplary implementation mode, an extension section of the fifth signal lead 210-5 is arranged on a side of an extension section of the fourth signal lead 210-4 close to the touch region, namely four signal leads in a first group of leads 211 are arranged on a side of the fifth signal lead 210-5 away from the touch region, and a grounding line 220 is arranged on a side of the first signal lead 210-1 away from the touch region.

In an exemplary implementation mode, multiple dummy line segments 230 may be arranged between the first signal lead 210-1 and the grounding line 220, wherein the multiple dummy line segments 230 are sequentially arranged along a direction away from the touch region, and each of the dummy line segments 230 extends along the shape of the bezel.

Figure 14:
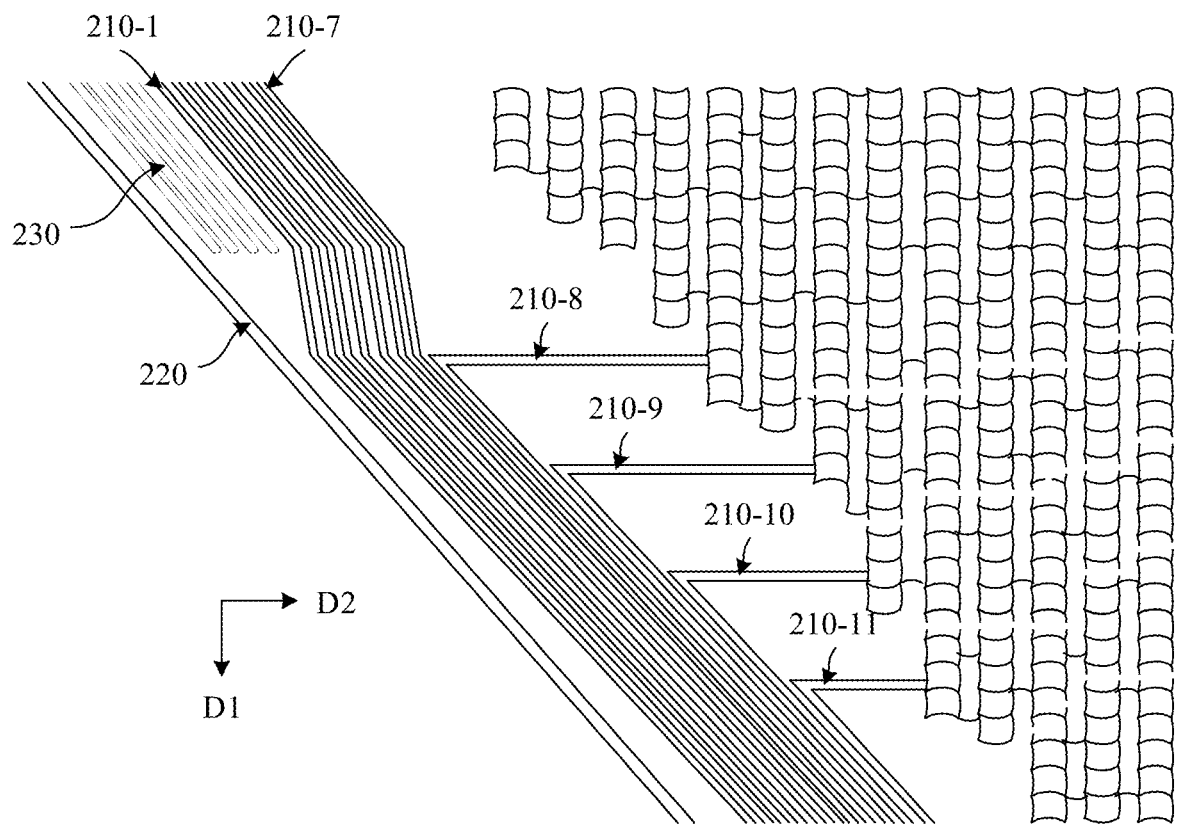
FIG. 14 is a schematic diagram of a third group of leads according to an exemplary embodiment of the present disclosure.

FIG. 14 is a schematic diagram of a third group of leads according to an exemplary embodiment of the present disclosure, and is an enlarged view of a region C in FIG. 11. As shown in FIG. 14, the third group of leads 213 may include an eighth signal lead 210-8, a ninth signal lead 210-9, a tenth signal lead 210-10, and an eleventh signal lead 210-11, wherein the four signal leads are connected with four touch wirings in a third group of wirings in a touch region respectively. In an exemplary implementation mode, each of the signal leads includes a leading-out section and an extension section. A first end of the leading-out section is connected with a touch wiring connected with a touch electrode, while a second end of the leading-out section is connected with a first end of the extension section after extending along a direction opposite to a second direction D2, and a second end of the extension section extends to a bonding region along a shape of a bezel.

The eighth signal lead 210-8, the ninth signal lead 210-9, the tenth signal lead 210-10, and the eleventh signal lead 210-11 form a nested lead structure. The eleventh signal lead 210-11 is embedded within the tenth signal lead 210-10, the tenth signal lead 210-10 is embedded within the ninth signal lead 210-9, and the ninth signal lead 210-9 is embedded within the eighth signal lead 210-8.

In an exemplary implementation mode, an extension section of the eighth signal lead 210-8 is arranged on a side of an extension section of the seventh signal lead 210-7 close to the touch region, namely seven signal leads in a first group of leads 211 and a second group of leads 212 are arranged on a side of the eighth signal lead 210-8 away from the touch region, and a grounding line 220 is arranged on a side of the first signal lead 210-1 away from the touch region.

In an exemplary implementation mode, multiple dummy line segments 230 may be arranged between the first signal lead 210-1 and the grounding line 220. The multiple dummy line segments 230 are sequentially arranged along a direction away from the touch region, and each of the dummy line segments 230 extends along the shape of the bezel.

Figure 15:
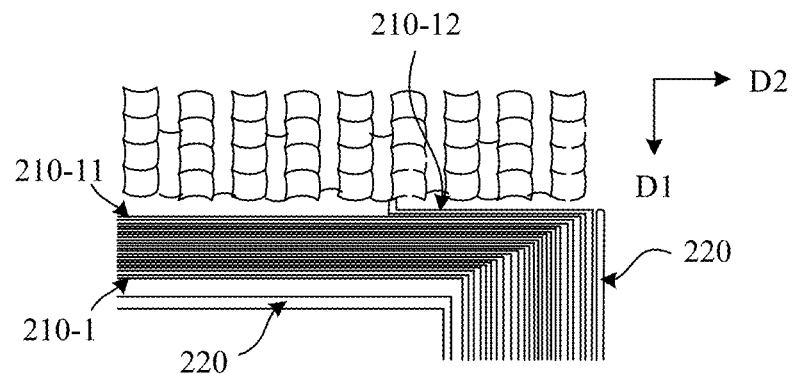
FIG. 15 is a schematic diagram of a fourth group of leads according to an exemplary embodiment of the present disclosure.

FIG. 15 is a schematic diagram of a fourth group of leads according to an exemplary embodiment of the present disclosure, and is an enlarged view of a region D in FIG. 11. As shown in FIG. 14, a fourth group of leads 214 may include a twelfth signal lead 210-12, wherein the signal lead is connected with a touch wiring in a fourth group of wirings in a touch region. In an exemplary implementation mode, the twelfth signal lead 210-12 includes a leading-out section and an extension section. A first end of the leading-out section is connected with a touch wiring connected with a touch electrode, while a second end of the leading-out section is connected with a first end of the extension section after extending along a second direction D2, and a second end of the extension section extends to a bonding region along a first direction D1.

In an exemplary implementation mode, 11 signal leads in the first group of leads 211, the second group of leads 212, and the third group of leads 213 are arranged on a side of the twelfth signal lead 210-12 in the first direction D1. One grounding line 220 is arranged on a side of the first signal lead 210-1 away from the touch region, and is bent and extends to the bonding region after extending along the second direction D2. Another grounding line 220 is arranged on a side of an extension section of the twelfth signal lead 210-12 in the second direction D2, and extends to the bonding region along the first direction D1.

Figure 16:
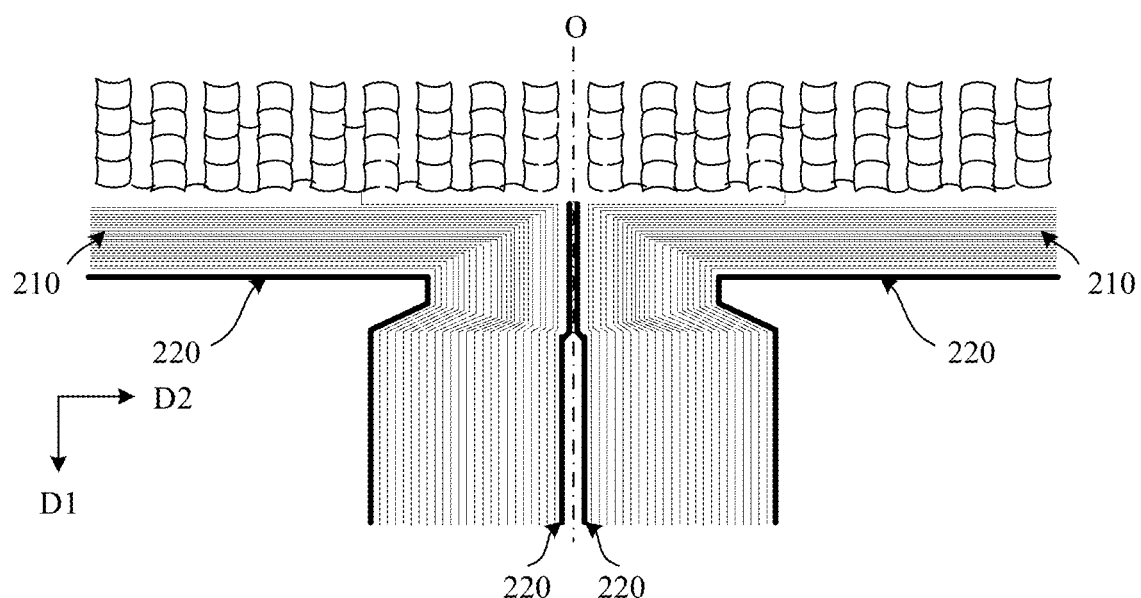
FIG. 16 is a schematic diagram of a lead collection region in a bezel region according to an exemplary embodiment of the present disclosure.

FIG. 16 is a schematic diagram of a lead collection region in a bezel region according to an exemplary embodiment of the present disclosure. As shown in FIG. 16, multiple signal leads 210 extend to a bonding region along a first direction D1 after collected in the lead collection region in a bezel region. The multiple signal leads 210 are arranged between two grounding lines 220 on two sides of a centerline O, and the grounding lines 220 may shield the signal leads so that the signal leads will not be affected by static electricity and interference signals.

Figure 17:
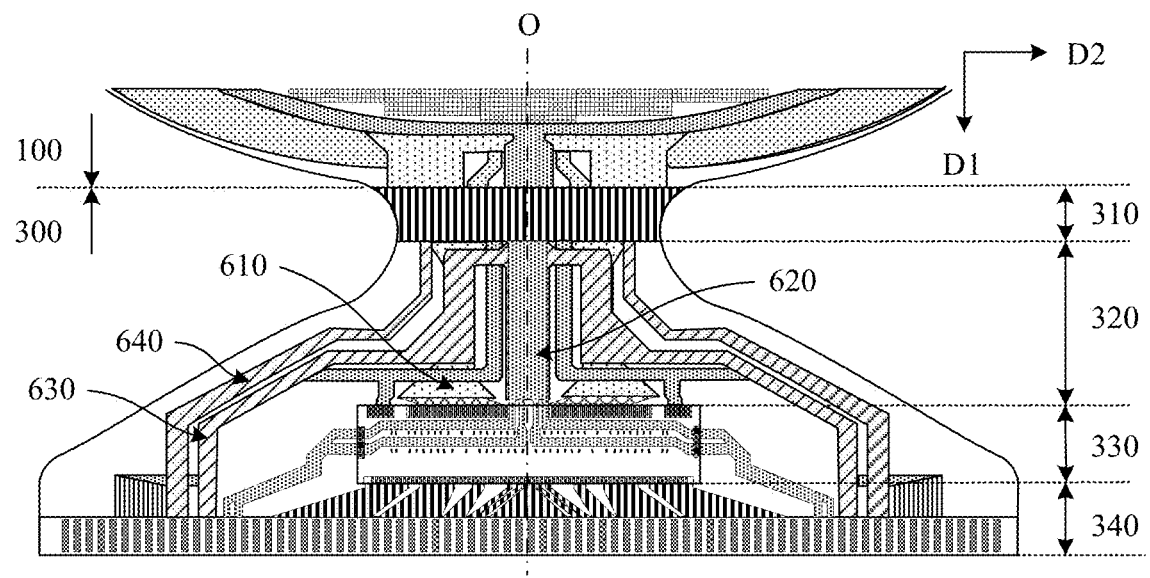
FIG. 17 is a schematic diagram of a bonding region according to an exemplary embodiment of the present disclosure.

FIG. 17 is a schematic diagram of a bonding region according to an exemplary embodiment of the present disclosure. As shown in FIG. 17, a bonding region 300 is arranged on a side of a touch region 100 in a first direction D1, and may include a bending region 310, a wiring region 320, a chip region 330, and a pin bonding region 340 that are sequentially arranged along the first direction D1 (i.e., a direction away from the touch region 100). In an exemplary implementation mode, the bending region 310 is configured to bend the bonding region to a back of a touch panel, the wiring region 320 is configured to lead out data signal lines, power signal lines, touch signal lines, etc., to set positions, the chip region 330 is configured to bond an integrated circuit chip, and the pin bonding region 340 is configured to be provided with multiple bonding pins. The multiple bonding pins may be bonded with a Flexible Printed Circuit (FPC for short) such that the data signal lines, the power signal lines, and the touch signal lines are connected with an external control apparatus through the bonding pins and the bonded Flexible Printed Circuit. The external control apparatus provides data signals, power signals, and touch signals for a display panel or a display backplane so as to achieve functions of image display and touching.

In an exemplary implementation modes, an array test unit (not shown) is further arranged on a side of the bonding region 300 away from the touch region 100, wherein the array test unit includes multiple test terminals (Electrical Test (ET) pads). The multiple test terminals are correspondingly connected with multiple bonding pins in the pin bonding region through interface lines, and are configured to test a display substrate and a touch panel so as to check whether there are problems such as a short circuit and an open circuit. In an exemplary implementation mode, a cutting line is arranged between the bonding region 300 and the array test unit, and after a test is completed, cutting equipment removes the array test unit by cutting along the cutting line.

In an exemplary implementation mode, the data signal lines and the power signal lines in the display substrate and the touch signal lines (signal leads) in the touch panel are collected at first in the lead collection region in the bezel region, and then extend to the bonding region from the lead collection region. In the bonding region, these signal lines first extend across the bending region 310 through multiple connection lines, and then are led out to corresponding positions in the wiring region 320. The data signal lines 610 and the touch signal lines 620 are led to the chip region 330 and correspondingly connected with pins in the chip region. The power signal lines at least include a first power supply line (VDD) 630 and a second power supply line (VSS) 640, wherein the first power supply line 630 and the second power supply line 640 are led to the pin bonding region 340 and correspondingly connected with corresponding bonding pins. The first power supply line 630 and the second power supply line 640 are configured as a high-voltage power supply line and a low-voltage power supply line respectively connected with the display substrate or a display backplane.

In an exemplary implementation mode, the first power supply line and the second power supply line may be arranged in a same layer, and may be arranged in a layer different from the data signal lines. The touch signal lines and the data signal lines may be arranged in different layers. There is an overlapping region between an orthographic projection of the data signal lines on a plane of the bonding region and orthographic projections of the first power supply line and the second power supply line on the plane of the bonding region. There is an overlapping region between an orthographic projection of the touch signal lines on the plane of the bonding region and the orthographic projections of the first power supply line and the second power supply line on the plane of the bonding region, and the first power supply line and the second power supply line may provide a shielding function for the data signal lines and the touch signal lines so as to avoid signal interferences and improve reliability of signal transmission. In an exemplary implementation mode, the bonding region may include an antistatic region, signal lines in the bonding region may include scanning signal lines for transmission to a gate driving circuit, and grounding lines for transmission to a touch panel, etc., which is not limited in the present disclosure.

In an exemplary implementation mode, the data signal lines 610 may be arranged on two sides of the touch signal lines 620, wherein the orthographic projection of the data signal lines 610 on the plane of the bonding region is not overlapped with the orthographic projection of the touch signal lines 620 on the plane of the bonding region. In the present disclosure, the orthographic projection of the data signal lines on the plane of the bonding region is not overlapped with the orthographic projection of the touch signal lines on the plane of the bonding region, so that a problem of signal crosstalk caused by mutual intersection of the touch signal lines and the data signal lines is solved, and touch performance is improved.

In a display apparatus, a display driver integrated circuit is usually arranged in a chip region, and a touch IC is arranged on a Flexible Printed Circuit (FPC) connected with a pin bonding region, wherein the display driver integrated circuit is configured to drive displaying of a display substrate, and the touch IC is configured to drive touching of a touch panel. Usages show that setting up independent display driver integrated circuit and touch integrated circuit not only brings problems of a large number of components and a high overall cost, but also leads to problems of low touch sensitivity, loud display noises, and large device thickness, etc.

In an exemplary embodiment of the present disclosure, a Touch and Display Driver Integration (TDDI) circuit is used as an integrated circuit in the chip region. In the present disclosure, the Touch and Display Driver Integration circuit is arranged in the chip region, so that touch sensitivity is improved effectively, display noises are reduced effectively, and first-rate capacitance touch performance may be provided. A display driver and a touch driver are integrated in a same chip, so that a quantity of touch structure layers may be reduced, which improves a light transmittance of a touch panel and contributes to improving brightness of a display apparatus, and a thickness of the display apparatus may be reduced, which is conducive to meeting design requirements for a small thickness of the display apparatus. In addition, the use of the touch and display driver integration circuit effectively reduces a quantity of components and supply chains of equipment manufacturers, simplifies preparation processes, improves a yield, and reduces an overall cost.

Figure 18:
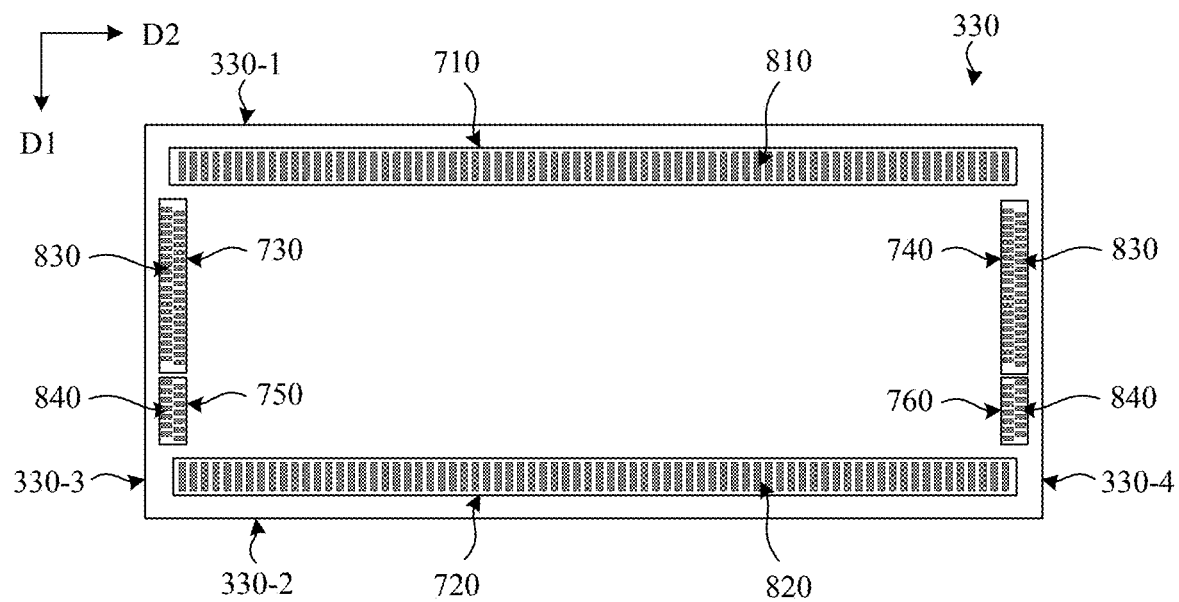
FIG. 18 is a schematic diagram of an arrangement of pins in a chip region according to an exemplary embodiment of the present disclosure.

FIG. 18 is a schematic diagram of an arrangement of pins in a chip region according to an exemplary embodiment of the present disclosure. In an exemplary implementation mode, a chip region 330 in a bonding region may be rectangular, and is provided with multiple pins, wherein the multiple pins are configured to bond and connect multiple terminals of a driver IC (touch and display driver integration circuit), and an edge of the driver IC may coincide with a boundary of the chip region 330. In an exemplary implementation mode, the chip region 330 may include a first edge, a second edge, a third edge, and a fourth edge that form a rectangle. The first edge and the second edge extend along a second direction D2, the third edge and the fourth edge extend along a first direction D1, the first edge is close to a touch region, and the second edge is away from the touch region.

As shown in FIG. 18, the chip region 330 may include a first edge 330-1 that extends along the second direction D2 and is close to the touch region, a second edge 330-2 that extends along the second direction D2 and is away from the touch region, and a third edge 330-3 and a fourth edge 330-4 that extend along the first direction D1 and are connected with the first edge and the second edge respectively.

In an exemplary implementation mode, the chip region 330 may include a first pin region 710, a second pin region 720, a third pin region 730, a fourth pin region 740, a fifth pin region 750, and a sixth pin region 760.

In an exemplary implementation mode, the first pin region 710 may be arranged at the first edge 330-1 of the chip region 330, the second pin region 720 may be arranged at the second edge 330-2 of the chip region 330, and the first pin region 710 and the second pin region 720 are arranged opposite to each other in the first direction D1.

In an exemplary implementation mode, the third pin region 730 and the fifth pin region 750 may be arranged at the third edge 330-3 of the chip region 330, and the third pin region 730 and the fifth pin region 750 may be sequentially arranged in the first direction D1. The fourth pin region 740 and the sixth pin region 760 may be arranged at the fourth edge 330-4 of the chip region 330, the fourth pin region 740 and the sixth pin region 760 may be sequentially arranged along the first direction D1, the third pin region 730 and the fourth pin region 740 may be arranged opposite to each other in the second direction D2, and the fifth pin region 750 and the sixth pin region 760 may be arranged opposite to each other in the second direction D2.

In an exemplary implementation mode, the pins may be divided into display pins and touch pins, wherein the display pins are configured to be connected with display signal lines, and the touch pins are configured to be connected with touch signal lines. The display pins may be divided into display signal output pins and display signal input pins, wherein the display signal output pins are configured to be connected with data signal lines, and display signals are output through the display signal output pins and the data signal lines. The display signal input pins are configured to be connected with an external circuit board through display connection lines and a pin bonding region in the bonding region such that the external circuit board inputs display signals through the pin bonding region, the display connection lines, and the display signal input pins. The touch pins may be divided into touch signal output pins and touch signal input pins, wherein the touch signal output pins are configured to be connected with the touch signal lines, and touch signals are output to touch electrodes through the touch signal output pins and the touch signal lines. The touch signal input pins are configured to be connected with touch input lines, and touch signals are output to the touch signal output pins through the touch input lines and the touch signal input pins.

In an exemplary implementation mode, the first pin region 710 may include multiple first pins 810, wherein the multiple first pins 810 are configured to be correspondingly connected with multiple data signal lines, and display signals, such as data signals, are output to a display substrate or a display backplane through the first pins 810 and the data signal lines. In an exemplary implementation mode, the first pin region 710 may be referred to as a display signal output pin region, and the first pins 810 may be referred to as display signal output pins.

In an exemplary implementation mode, the second pin region 720 may include multiple second pins 820, wherein the multiple second pins 820 are configured to be correspondingly connected with one ends of multiple display connection lines, and the other ends of the multiple display connection lines are correspondingly connected with multiple bonding pins in the pin bonding region 340, such that an external control apparatus inputs display signals to a display substrate or a display backplane through the bonding pins, the display connection lines, and the second pins 820. In an exemplary implementation mode, the second pin region 720 may be referred to as a display signal input pin region, and the second pins 820 may be referred to as display signal input pins.

In an exemplary implementation mode, each of the third pin region 730 and the fourth pin region 740 may include multiple third pins 830, wherein the multiple third pins 830 are configured to be correspondingly connected with multiple touch signal lines, and touch signals are output to a touch panel through the third pins 830 and the touch signal lines. In an exemplary implementation mode, the third pin region 730 and the fourth pin region 740 may be referred to as touch signal output pin regions, and the third pins 830 may be referred to as touch signal output pins.

In an exemplary implementation mode, each of the fifth pin region 750 and the sixth pin region 760 may include multiple fourth pins 840, wherein the multiple fourth pins 840 are configured to be correspondingly connected with one ends of touch input lines, and the other ends of multiple touch input lines are correspondingly connected with multiple bonding pins in the pin bonding region, such that an external control apparatus provides touch signals for touch signal output pins through the bonding pins, the touch input lines, and the fourth pins. In an exemplary implementation mode, the fifth pin region 750 and the sixth pin region 760 may be referred to as touch signal input pin regions, and the fourth pins 840 may be referred to as touch signal input pins.

In an exemplary implementation mode, an aligned structure with a single row or a staggered structure with two or more rows may be used for pins in at least one of the first pin region 710 to the sixth pin region 760.

In an exemplary implementation mode, single-row transverse alignment may be used for pins in the first pin region 710 and the second pin region 720, wherein multiple pins are sequentially arranged along the second direction D2 and aligned in the first direction D1, so as to form a single-row structure. Two-row longitudinal alignment may be used for the third pin region 730 to the sixth pin region 760. Pins in each pin region are in a two-row structure, multiple pins in each row are sequentially arranged along the first direction D1 and aligned in the second direction D2, and multiple pins in a first row are staggered with multiple pins in a second row.

Figure 19:
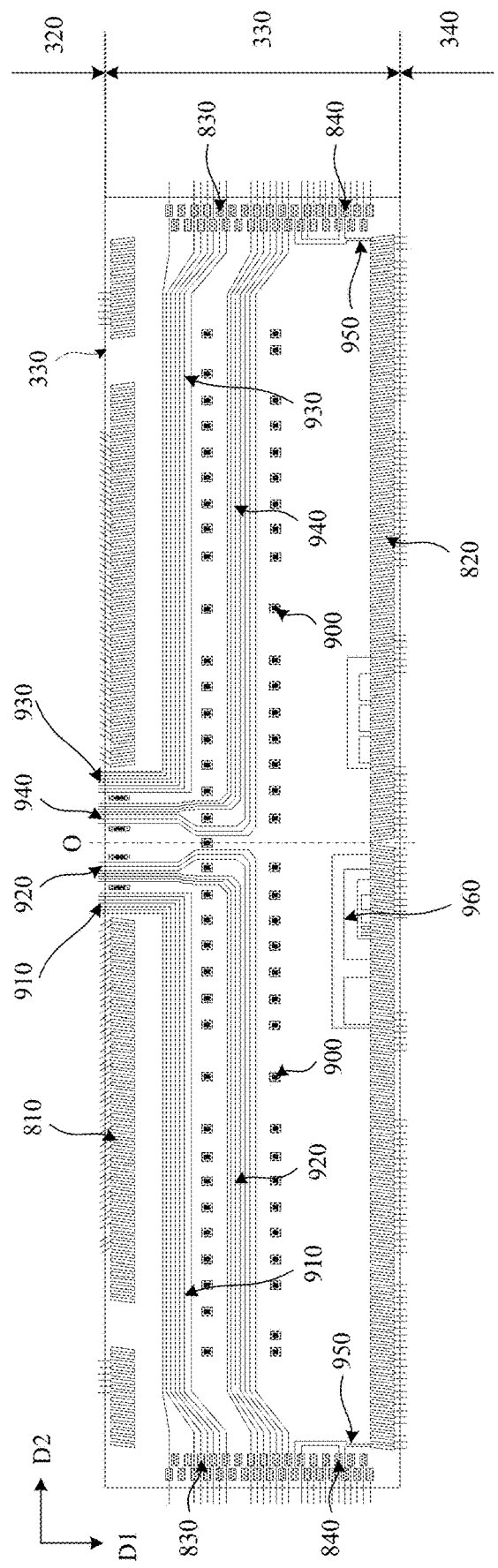
FIG. 19 is a schematic diagram of an arrangement of wirings in a chip region according to an exemplary embodiment of the present disclosure.

FIG. 19 is a schematic diagram of an arrangement of wirings in a chip region according to an exemplary embodiment of the present disclosure, wherein pins and touch signal lines are merely examples for description, and quantities of the pins and the touch signal lines do not represent actual quantities. As shown in FIG. 19, a chip region 330 may be arranged symmetrically relative to a centerline O, wherein the centerline O may be a straight line extending along a first direction D1 and equally dividing a bonding region (or the chip region). In an exemplary implementation mode, multiple pins and multiple touch signal lines may be arranged in the chip region 330, wherein the multiple pins and the multiple touch signal lines may be mirror-symmetrically arranged relative to the centerline O.

In an exemplary implementation mode, the multiple data signal lines extend from a wiring region 320 to the chip region 330, and are correspondingly connected with multiple first pins 810 in a first pin region, and display signals are output to a display substrate or a display backplane through the first pins and the data signal lines. Multiple second pins 820 in a second pin region are correspondingly connected with first ends of multiple display connection lines, and second ends of the multiple display connection lines are correspondingly connected with multiple bonding pins in a pin bonding region after extending along a direction away from a touch region, such that an external control apparatus provides display signals for the display substrate or the display backplane through the bonding pins, the display connection lines, and the second pins.

In an exemplary implementation mode, the multiple touch signal lines, after extending from a lead collection region in a bezel region to the bonding region, extend across a bent region at first through multiple connection lines, then extend into the chip region 330 along the wiring region 320, and are correspondingly connected with multiple third pins 830 after extending in the chip region 330, and touch signals are output to a touch panel through the third pins and the touch signal lines.

In an exemplary implementation mode, the multiple touch signal lines may include a first group of touch signal lines and a second group of touch signal lines, wherein the two groups of touch signal lines are arranged on two sides of the centerline O, and may be arranged symmetrically relative to the centerline O. For example, the first group of touch signal lines is arranged on a left side of the centerline O, the second group of touch signal lines is arranged on a right side of the centerline O, multiple touch signal lines in the first group of touch signal lines are configured to transmit touch signals for multiple touch electrodes on a left side of the touch region, and multiple touch signal lines in the second group of touch signal lines are configured to output touch signals for multiple touch electrodes on a right side of the touch region.

In an exemplary implementation mode, on the left side of the centerline O, the first group of touch signal lines may include a first output line group and a second output line group, wherein the first output line group may include multiple first touch signal lines 910, the second output line group may include multiple second touch signal lines 920. A distance between the first output line group and the centerline O is longer than that between the second output line group and the centerline O, namely the multiple first touch signal lines 910 are arranged on a side of the multiple second touch signal lines 920 away from the centerline O. The multiple first touch signal lines 910 and the multiple second touch signal lines 920 extend to the chip region 330, and are correspondingly connected with multiple third pins 830 in a third pin region after extending in the chip region 330 towards the third pin region (left side).

In an exemplary implementation mode, on the right side of the centerline O, the second group of touch signal lines may include a third output line group and a fourth output line group, wherein the third output line group may include multiple third touch signal lines 930, the fourth output line group may include multiple fourth touch signal lines 940. A distance between the third output line group and the centerline O is longer than that between the fourth output line group and the centerline O, namely the multiple third touch signal lines 930 are arranged on a side of the multiple fourth touch signal lines 940 away from the centerline O. The multiple third touch signal lines 930 and the multiple fourth touch signal lines 940 extend to the chip region 330, and are correspondingly connected with multiple third pins 830 in a fourth pin region after extending in the chip region 330 towards the fourth pin region (right side).

In an exemplary implementation mode, multiple first connection lines 950 may be arranged on a side of the fifth pin region and the sixth pin region close to the centerline O, wherein the multiple first connection lines 950 are configured to be connected with part of the fourth pins 840 and the second pins 820 so as to provide same signals for corresponding pins. Multiple second connection lines 960 may be arranged on a side of the second pin region away from a pin bonding region 340, wherein the second connection lines 960 are configured to be connected with part of the second pins 820 so as to provide same signals for corresponding pins. Generally, a common signal needs to be used for a display signal and a touch signal, such as a high-level signal provided by a first power supply line (VDD) and a low-level signal provided by a second power supply line (VSS), and parallel processing with the first connection lines and the second connection lines may reduce a resistance effectively and improve signal uniformity.

In an exemplary implementation mode, at least one dummy pin 900 may be arranged in the chip region 330, wherein the dummy pin is a pin into which no electrical signal is introduced. In an exemplary implementation mode, the dummy pin 900 may be arranged at any one or more of following positions: between the multiple first touch signal lines 910, on one or two sides of the multiple first touch signal lines 910, between the multiple second touch signal lines 920, on one or two sides of the multiple second touch signal lines 920, between the multiple third touch signal lines 930, on one or two sides of the multiple third touch signal lines 930, between the multiple fourth touch signal lines 940, and on one or two sides of the multiple fourth touch signal lines 940.

In the present disclosure, multiple touch signal lines are led to the chip region, and are connected with corresponding pins after extending in the chip region, so that space outside the chip region is saved effectively, which is conducive to reducing an area of the bonding region and difficulties in design, and electrostatic and noise interferences are avoided effectively, which ensures touch performance to the greatest extent. In addition, in the present disclosure, multiple dummy pins capable of supporting a driver IC are arranged, so that the driver IC may be bonded to the chip region smoothly without crushing touch signal lines in a bonding process, which improves process quality.

Figure 20:
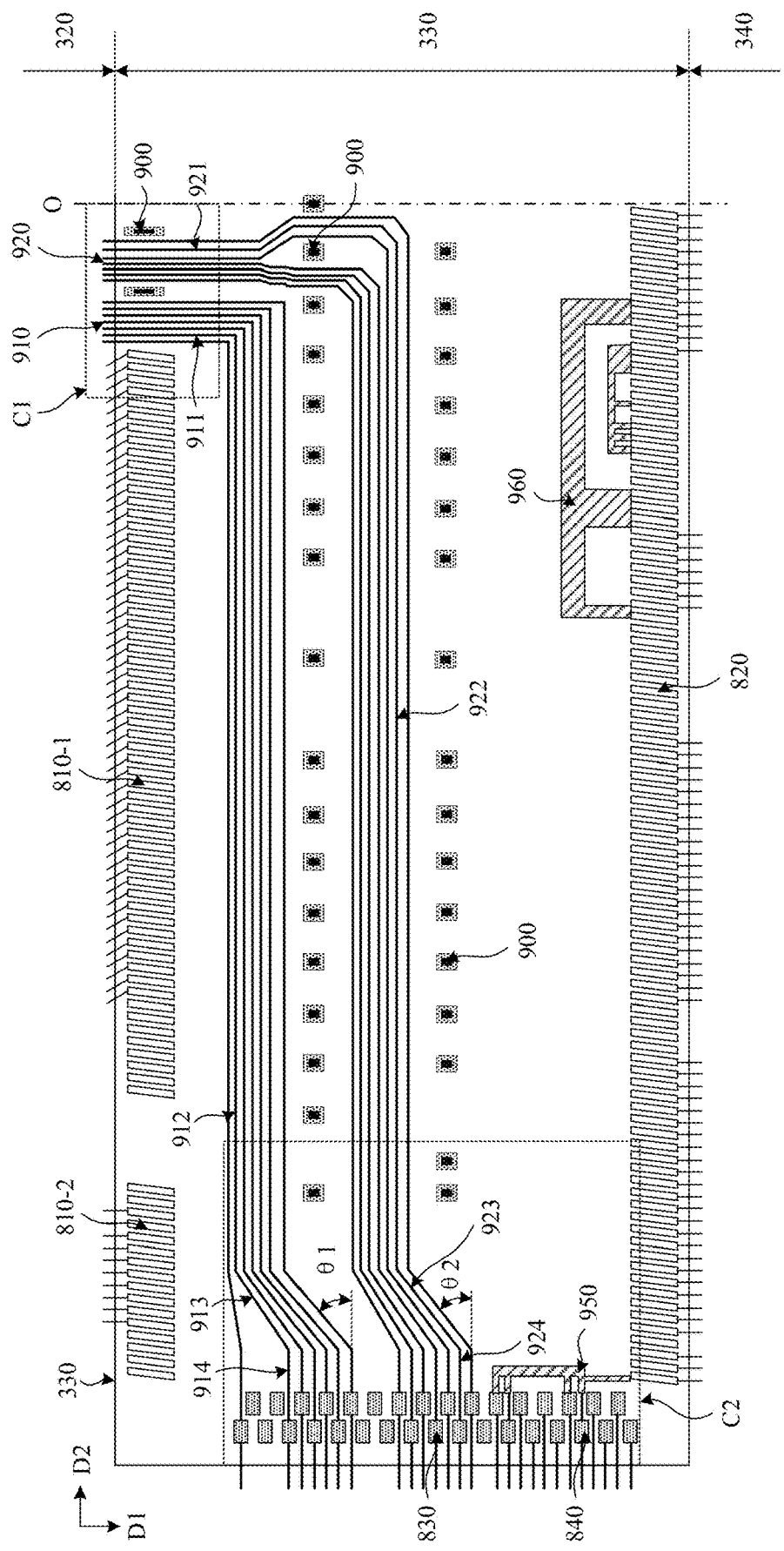
FIG. 20 is a schematic diagram of a left side of the chip region in FIG. 19.

FIG. 20 is a schematic diagram of a left side of the chip region in FIG. 19. As shown in FIG. 20, in an exemplary implementation mode, a first pin region may include a control pin sub-region and a data pin sub-region, wherein the data pin sub-region is arranged on a side of the data pin sub-region away from a centerline O. The data pin sub-region may include multiple data pins 810-1, and the control pin sub-region may include multiple control pins 810-2. The multiple data pins 810-1 are configured to be correspondingly connected with multiple data signal lines, and data signals are output to a display substrate or a display backplane through the data pins 810-1 and the data signal lines. The multiple control pins 810-2 are configured to be correspondingly connected with multiple control signal lines, and control signals, such as Gate On Array (GOA) signals, are output to the display substrate or the display backplane through the control pins 810-2 and the control signal lines.

In an exemplary implementation mode, multiple second pins 820 in a second pin region are correspondingly connected with first ends of multiple display connection lines, and second ends of the multiple display connection lines are correspondingly connected with multiple bonding pins in a pin bonding region 340 after extending towards a direction away from a touch region, such that an external control apparatus inputs display signals through the bonding pins, the display connection lines, and the second pins. Multiple second connection lines 960 may be arranged on a side of the second pin region away from the pin bonding region 340, wherein the second connection lines 960 are configured to be connected with part of the second pins 820.

In an exemplary implementation mode, at least one first touch signal line 910 may include a first output line segment 911, a second output line segment 912, a third output line segment 913, and a fourth output line segment 914 that are sequentially connected. The first output line segment 911 may be parallel to a first direction D1, the second output line segment 912 and the fourth output line segment 914 may be parallel to a second direction D2, the third output line segment 913 may be an oblique line, and there is a first included angle θ1 between the third output line segment 913 and the second direction D2. In an exemplary implementation mode, a first end of the first output line segment 911 is located at an edge of the chip region 330 and connected with a touch signal line extending from the touch region to the chip region, and a second end of the first output line segment 911 is connected with a first end of the second output line segment 912 after extending along the first direction D1. A second end of the second output line segment 912 is connected with a first end of the third output line segment 913 after extending along a direction opposite to the second direction D2. A second end of the third output line segment 913 is connected with a first end of the fourth output line segment 914 after extending to a third pin 830. A second end of the fourth output line segment 914 is connected with a corresponding third pin 830 after extending along the direction opposite to the second direction D2.

In an exemplary implementation mode, at least one second touch signal line 920 may include a first output line segment 921, a second output line segment 922, a third output line segment 923, and a fourth output line segment 924 that are sequentially connected. The second output line segment 922 and the fourth output line segment 924 may be parallel to the second direction D2, the third output line segment 923 may be an oblique line, and there is a second included angle θ2 between the third output line segment 923 and the second direction D2. In an exemplary implementation mode, a first end of the first output line segment 921 is located at an edge of the chip region 330 and connected with a touch signal line extending from the touch region to the chip region, and a second end of the first output line segment 921 is connected with a first end of the second output line segment 922 after extending toward a direction away from a display region. A second end of the second output line segment 922 is connected with a first end of the third output line segment 923 after extending along the direction opposite to the second direction D2. A second end of the third output line segment 923 is connected with a first end of the fourth output line segment 924 after extending to a fourth pin 840. A second end of the fourth output line segment 924 is connected with a corresponding fourth pin 840 after extending along the direction opposite to the second direction D2.

In an exemplary implementation mode, multiple first connection lines 950 may be arranged on a side of fourth pins 840 close to a centerline O, wherein one ends of the first connection lines 950 are connected with part of the fourth pins 840, while the other ends of the first connection lines 950 are connected with part of the second pins 820.

In an exemplary implementation mode, the first included angle θ1 may be the same as or different from the second included angle θ2. First included angles θ1 corresponding to multiple third output line segments 913 may be the same or different. Second included angles θ2 corresponding to multiple third output line segments 923 may be the same or different. The first included angle θ1 and the second included angle θ2 may be about 20° to 80°. For example, the first included angle θ1 and the second included angle θ2 may be about 45°.

In an exemplary implementation mode, multiple first output line segments 921 may include a first output line segment group and a second output line segment group. The first output line segment group may include multiple first broken lines bent in a direction close to the centerline O, the second output line segment group may include multiple second broken lines bent in a direction away from the centerline O, the multiple first broken lines and the multiple second broken lines form at least one polygonal region, and at least one dummy pin 900 is arranged in the polygonal region.

In an exemplary implementation mode, at least one dummy pin 900 may be arranged between multiple first output line segments 911 and the multiple first output line segments 921, and at least one dummy pin 900 may be arranged between the multiple first output line segments 921 and the centerline O.

In an exemplary implementation mode, multiple dummy pins 900 may be arranged between multiple second output line segments 912 and multiple second output line segments 922, wherein the multiple dummy pins 900 may be sequentially arranged along the second direction D2.

In an exemplary implementation mode, multiple dummy pins 900 may be arranged between the multiple second output line segments 922 and the multiple second pins 820 in the second pin region, wherein the multiple dummy pins 900 may be sequentially arranged along the second direction D2.

In an exemplary implementation mode, at least one dummy pin 900 may be arranged on the centerline O.

In an exemplary implementation mode, shapes and sizes of the multiple dummy pins 900 in the chip region 330 may be the same or different, and may be set according to actual needs, which is not limited in the present disclosure.

In the exemplary embodiment of the present disclosure, the dummy pins are arranged in a chip region, and the dummy pins may be arranged between touch signal lines, so that a driver IC may be bonded to the chip region smoothly without crushing the touch signal lines in a bonding process, which improves process quality, and interferences between the touch signal lines may be reduced to improve touch performance. In addition, a regular arrangement of the dummy pins is conducive to improving the process quality.

In an exemplary implementation mode, a structure on a right side of the chip region may be symmetric to that on a left side of the chip region about a centerline O.

Figure 21:
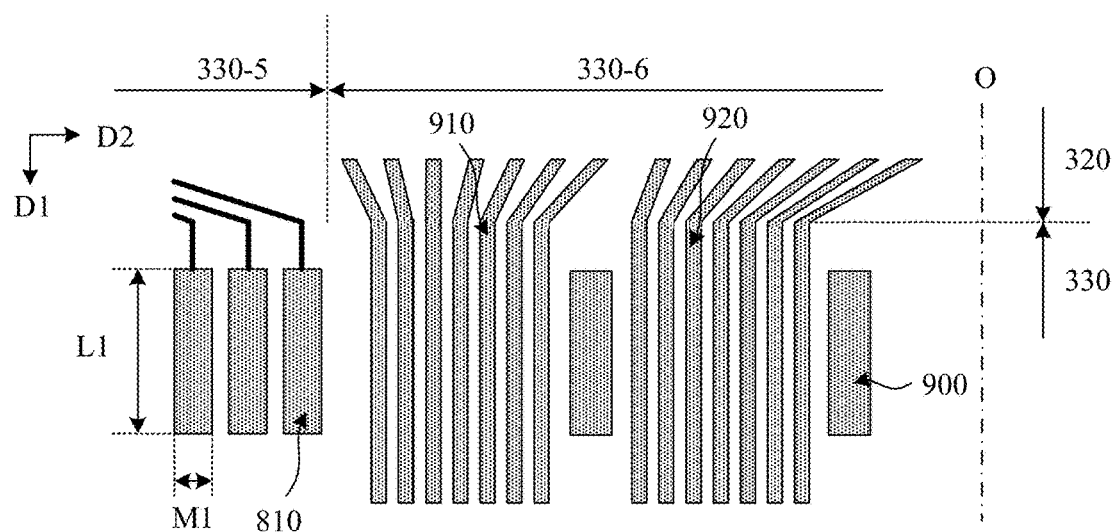
FIG. 21 is an enlarged view of a region C1 in FIG. 20.

FIG. 21 is an enlarged view of a region C1 in FIG. 20. As shown in FIGS. 20 and 21, the chip region 330 may be arranged symmetrically relative to the centerline O, wherein on a left side of the centerline O, a first edge of the chip region 330 may be divided into a pin sub-region 330-5 and a wiring sub-region 330-6. The wiring sub-region 330-6 is located on the left side of the centerline O, the pin sub-region 330-5 is located on a left side of the wiring sub-region 330-6, namely the pin sub-region 330-5 is located on a side of the wiring sub-region 330-6 away from the centerline O, the pin sub-region 330-5 is configured to be provided with multiple first pins 810 sequentially along the second direction D2, and the wiring sub-region 330-6 is configured to be provided with multiple touch signal lines sequentially along the second direction D2.

In an exemplary implementation mode, the multiple touch signal lines extending from the wiring region 320 to the chip region 330 may include a first output line group and a second output line group, wherein the first output line group may include multiple first touch signal lines 910, the second output line group may include multiple second touch signal lines 920, and a distance between the first output line group and the centerline O is longer than that between the second output line group and the centerline O, namely the multiple first touch signal lines 910 are arranged on a side of the multiple second touch signal lines 920 away from the centerline O.

In an exemplary implementation mode, in a region of the chip region 330 close to the first edge, at least one dummy pin 900 may be arranged between the first output line group and the second output line group, and at least one dummy pin 900 may be arranged between the second output line group and the centerline O. In an exemplary implementation mode, a shape of each dummy pin 900 may be a strip-shape extending along the first direction D1. For example, the dummy pin 900 may be in a shape of a rectangle, and a long side of the rectangle extends along the first direction D1.

In an exemplary implementation mode, a shape of each first pin 810 may be a rectangle whose long side extends along the first direction D1. In an exemplary implementation mode, a first length L1 of the first pin 810 may be about 100 μm to 120 μm, a first width M1 of the first pin 810 may be about 20 μm to 30 μm, and a width-to-length ratio (M1/L1) may be about 0.2 to 0.3, wherein the first length L1 is a size in the first direction D1, and the first width M1 is a size in the second direction D2. In an exemplary implementation mode, a pitch of the first pins may be about 40 μm to 60 μm.

In an exemplary implementation mode, structures of multiple touch signal lines on a right side of the centerline O may be the same as those on a left side of the centerline O and symmetrically arranged relative to the centerline O, which will not be repeated here.

Figure 22:
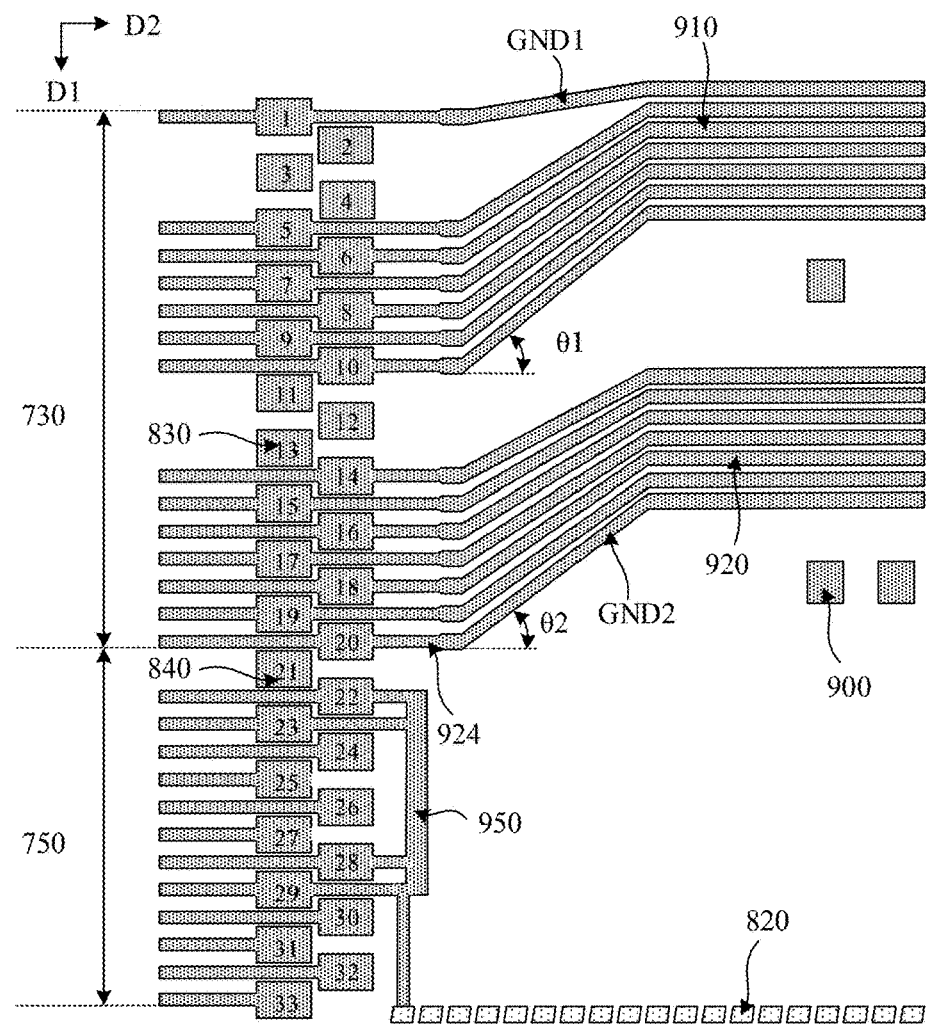
FIG. 22 is an enlarged view of a region C2 in FIG. 20.

FIG. 22 is an enlarged view of a region C2 in FIG. 20. As shown in FIGS. 20 and 22, a third pin region 730 and a fifth pin region 750 that are sequentially arranged along the first direction D1 are arranged at a third edge on a left side of the chip region, wherein the third pin region 730 may include multiple third pins 830 arranged in two rows in a longitudinal staggered manner, and the fifth pin region 750 may include multiple fourth pins 840 arranged in two rows in a longitudinal staggered manner.

In an exemplary implementation mode, the third pin region 730 may include 20 third pins 830 (a pin 1 to a pin 20), and the fifth pin region 750 may include 13 fourth pins 840 (a pin 21 to a pin 33).

In an exemplary implementation mode, the pin 1 in the third pin region 730 is connected with a first grounding line GND1, a pin 2 to a pin 4 are first idle pins, a pin 5 to a pin 10 are connected with five first touch signal lines 910 respectively, a pin 11 to a pin 13 are second idle pins, a pin 14 to a pin 19 are connected with five second touch signal lines 920 respectively, and the pin 20 is connected with a second grounding line GND2. In this way, the first idle pins are arranged between the first grounding pin and touch signal output pins, and the second idle pins are arranged between the touch signal output pins.

In an exemplary implementation mode, each of the first grounding line GND1 and the five first touch signal lines 910 may include a first output line segment, a second output line segment, a third output line segment, and a fourth output line segment that are sequentially connected. The second output line segment and the fourth output line segment are parallel to the second direction D2, and there is a first included angle θ1 between a third output line segment of a first touch signal line 910 and the second direction D2. In an exemplary implementation mode, a first included angle of a third output line segment in the first grounding line GND1 may be smaller than that of the third output line segment in the first touch signal line 910.

In an exemplary implementation mode, each of the second grounding line GND2 and the five second touch signal lines 920 may include a first output line segment, a second output line segment, a third output line segment, and a fourth output line segment that are sequentially connected. The second output line segment and the fourth output line segment are parallel to the second direction D2, and there is a second included angle θ2 between a third output line segment of a second touch signal line 920 and the second direction D2. In an exemplary implementation mode, a second included angle of a third output line segment in the second grounding line GND2 may be larger than that of the third output line segment in the second touch signal line 920.

In an exemplary implementation mode, the pin 21 in the fifth pin region 750 is a third idle pin, a pin 22, a pin 23, a pin 28, and a pin 29 are connected with a first connection line 950, and the first connection line 950 is connected with one second pin 820.

In an exemplary implementation mode, an idle pin is a pin not connected with any signal line, may be understood as a dummy pin, and may function for supporting and isolation to improve quality of a bonding process.

As mentioned above, a pin is connected with a touch signal line and a grounding line refers to that a right side of the pin (a side close to the centerline) is connected with the touch signal line and the grounding line. In an exemplary implementation mode, a left side of the pin (a side away from the centerline) may be connected with a corresponding connection line. For example, left sides of the pin 1 and pin 20 in the third pin region 730 may be connected with one ends of grounding connection lines, and the other ends of the grounding connection lines are connected with bonding pins in a pin bonding region, such that an external control apparatus transmits a grounding signal to a first grounding line and a second grounding line. For another example, left sides of the pin 5 to pin 19 in the third pin region 730 may be connected with one ends of touch connection lines, and the other ends of the touch connection lines are correspondingly connected with multiple bonding pins in the pin bonding region, such that an array test unit inputs/outputs a test signal through the bonding pins, the touch connection lines, and the third pins. For another example, left sides of a pin 22 to pin 23 in the fifth pin region 750 may be connected with one ends of touch input lines, and the other ends of the touch input lines are correspondingly connected with multiple bonding pins in the pin bonding region.

In an exemplary implementation mode, a first output line segment in each of the first touch signal line 910 and the second touch signal line 920 may be designed to be unequal in width, wherein a width of a side of the first output line segment close to a second output line segment may be larger than that of a side of the first output line segment away from the second output line segment. In an exemplary implementation mode, a width is a size in the first direction D1.

In an exemplary implementation mode, widths of multiple second output line segments in the first touch signal lines 910 and the second touch signal lines 920 may be the same, and spacing between adjacent second output line segments may be the same.

In an exemplary implementation mode, dummy pins 900 may be arranged between multiple second output line segments of the first touch signal lines 910 and multiple second output line segments of the second touch signal lines 920 and arranged between the multiple second output line segments of the second touch signal lines 920 and the multiple second pins 820.

In an exemplary implementation mode, a longitudinal alignment arrangement with a single row or a longitudinal staggered arrangement with multiple rows may be used for at least one of the third pin region 730 and the fifth pin region 750, which is not limited in the present disclosure.

In an exemplary implementation mode, a pin structure of a fourth edge on a right side of the chip region may be the same as that of the third edge and the pin structures are symmetrically arranged relative to the centerline O, which will not be repeated here.

Figure 23:
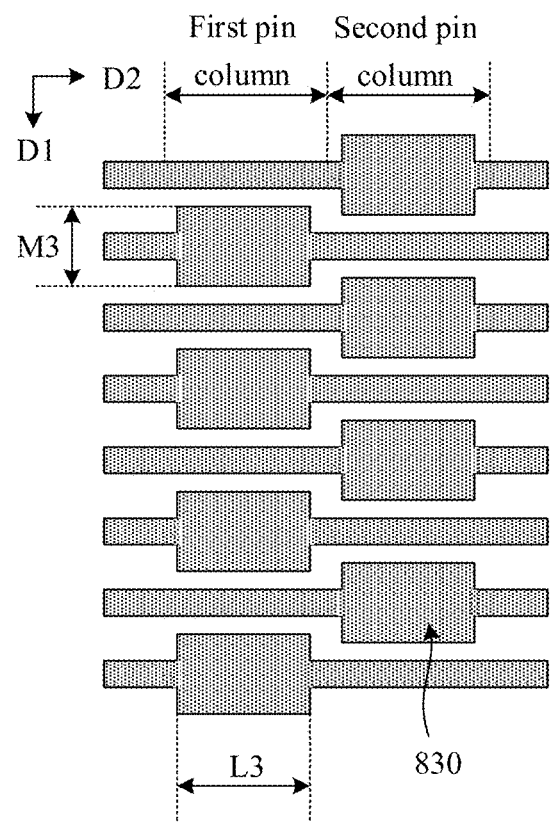
FIG. 23 is a schematic diagram of two rows of pins according to an exemplary embodiment of the present disclosure.

FIG. 23 is a schematic diagram of two rows of pins according to an exemplary embodiment of the present disclosure. Multiple third pins in a third pin region are taken as an example. As shown in FIG. 23, multiple third pins 830 are arranged in a first pin column and a second pin column, wherein multiple third pins 830 in each of the first pin column and the second pin column are all sequentially arranged along a first direction D1. The first pin column and the second pin column are sequentially arranged along a second direction D2, and multiple third pin pins 830 in the first pin column and multiple third pins 830 in the second pin column are arranged in a staggered manner in the first direction D1.

In an exemplary implementation mode, a staggered arrangement refers to that a centerline of one third pin in the first pin column in the second direction is located between centerlines of two adjacent third pins in the second pin column in the second direction, or, a centerline of one third pin in the second pin column in the second direction is located between centerlines of two adjacent third pins in the first pin column in the second direction, wherein a centerline in the second direction is a straight line extending along the second direction D2 and equally dividing the third pin.

In an exemplary implementation mode, distances between centerlines of adjacent third pins in the second direction may be equal.

In an exemplary implementation mode, shapes and geometric parameters of third pins in the first pin column may be the same as or different from those of third pins in the second pin column. Shapes and geometric parameters of third pins in a same pin column may be the same or different.

In an exemplary implementation mode, a shape of a third pin may be a rectangle, a third length L3 of the third pin may be about 60 μm to 90 μm, a third width M3 of the third pin may be about 40 μm to 60 μm, and a width-to-length ratio (M3/L3) may be about 0.5 to 1.0, wherein the third length L3 is a size in the second direction D2, and the third width M3 is a size in the first direction D1. In an exemplary implementation mode, spacing between the two pin columns may be about 15 μm to 20 μm. In an exemplary implementation mode, a pitch of the third pins may be about 70 μm to 90 μm.

In a display apparatus, since a display driver integrated circuit and a touch integrated circuit are arranged independently, a single-row transverse alignment arrangement mode or a single-row longitudinal alignment arrangement mode is usually used for pins in a chip region. Due to integration characteristics of a driver IC, a quantity of pins in an integrated circuit is increased, resulting in problems of insufficient space for an arrangement of the pins in the chip region, etc. If the transverse single-row alignment arrangement mode or the longitudinal single-row alignment arrangement mode is used, an area of a pin and spacing between pins may be reduced due to a limitation on transverse or longitudinal space. Reduction of the area of the pin will increase a contact resistance, which is prone to local heating and increases power consumption. Reduction of the spacing between the pins will result in insufficient margin of a bonding process, which is prone to misalignment, resulting in a failure of bonding.

In the exemplary embodiment of the present disclosure, a two-row longitudinal staggered arrangement mode is used for a chip region, wherein multiple pins are arranged in two columns, pins of the two columns are staggered, and each pin is in a shape of a rectangle with a relatively large width and length, so that an area of each pin may be increased, which reduces a contact resistance and eliminates local heating, and spacing between adjacent pins may be increased, which may ensure a margin of a bonding process and improves stability of the bonding process, quality of a product, and a yield. In addition, in the exemplary embodiment of the present disclosure, space in the chip region is utilized reasonably, so that a width and an area of each pin, and spacing between pins may be ensured, and spaces for arranging signal lines on two sides of the pin may be ensured, even though space of a bonding region is limited, which avoids possible short circuits of the signal lines.

Figure 24:
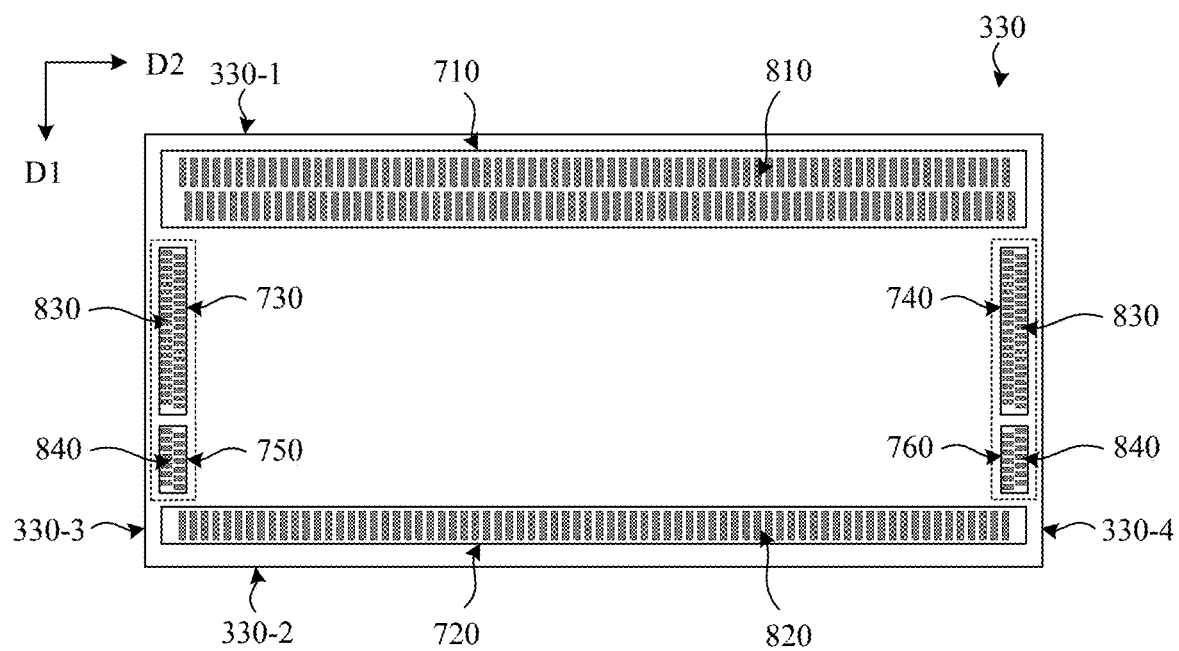
FIG. 24 is a schematic diagram of another arrangement of pins in a chip region according to an exemplary embodiment of the present disclosure.

FIG. 24 is a schematic diagram of another arrangement of pins in a chip region according to an exemplary embodiment of the present disclosure. In the exemplary embodiment, pin structures of a second edge 330-2, a third edge 330-3, and a fourth edge 330-4 are similar to the structure shown in FIG. 18, and a difference is that a transverse staggered arrangement structure with two rows is used for a first pin region 710 arranged at a first edge 330-1. As shown in FIG. 24, multiple first pins 810 are arranged in a first pin row and a second pin row, wherein multiple first pins 810 in each of the first pin row and the second pin row are all sequentially arranged along a second direction D2. The first pin row and the second pin row are sequentially arranged along a first direction D1. Multiple first pin pins 810 in the first pin row and multiple first pins 810 in the second pin row in the second direction D2 are arranged in a staggered manner.

In the exemplary embodiment of the present disclosure, a two-row transverse staggered mode is used for the first pin region, wherein multiple pins are arranged in two rows, and pins of the two rows are staggered, which may not only increase an area of each pin, reduce a contact resistance, and eliminate local heating, but also increase spacing between adjacent pins, ensure a margin of a bonding process, and improve stability of the bonding process, quality of a product, and a yield.

The present disclosure further provides a method for preparing a touch panel. In an exemplary implementation mode, the method may include:

forming a touch region and a bonding region located on a side of the touch region in a first direction, wherein the bonding region includes: a chip region, including a first edge, a second edge, a third edge, and a fourth edge, wherein the first edge and the second edge extend along a second direction, the second edge is located on a side of the first edge away from the touch region, and the third edge and the fourth edge extend along the first direction, wherein the first direction intersects with the second direction;

multiple pins located in the chip region and including multiple display pins and multiple touch pins, wherein the multiple display pins are arranged along the first edge and the second edge, the multiple touch pins are arranged along the third edge and the fourth edge, and the multiple display pins are configured to be connected with display signal lines;

multiple touch electrodes located in the touch region; and multiple touch signal lines located in the touch region and the bonding region, wherein the multiple touch signal lines are correspondingly connected with the multiple touch electrodes and the multiple touch pins.

An exemplary embodiment of the present disclosure further provides a display apparatus, including the display substrate of the above-mentioned embodiment. The display apparatus may be any product or component with a display function, such as a mobile phone, a tablet computer, a television, a monitor, a laptop computer, a digital photo frame, a navigator, an advertising board, a watch phone, an electronic book, a portable multimedia player, or display screens of various products of the Internet of Things. In an exemplary implementation mode, the display apparatus may be a wearable display apparatus that can be worn on a human body in some ways, such as a smart watch and a smart bracelet.

The drawings of the present disclosure only involve the structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present application.

The invention claimed is:

1. A touch panel, comprising a touch region and a bonding region, wherein the bonding region comprises:

a chip region, comprising a first edge, a second edge, a third edge, and a fourth edge;

a plurality of pins located in the chip region and comprising a plurality of touch pins, wherein the plurality of touch pins are arranged along the third edge and the fourth edge;

a plurality of touch electrodes located in the touch region; and a plurality of touch signal lines, located in the touch region and the bonding region, wherein the plurality of touch signal lines are correspondingly connected with the plurality of touch electrodes and the plurality of touch pins;

wherein the chip region comprises a first pin region, a second pin region, a third pin region, a fourth pin region, a fifth pin region, and a sixth pin region, the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region; and the plurality of touch pins comprise a plurality of touch signal output pins and a plurality of touch signal input pins, the plurality of touch signal output pins are arranged in the third pin region and the fourth pin region, and the plurality of touch signal input pins are arranged in the fifth pin region and the sixth pin region; and the touch signal output pins are configured to be connected with the touch signal lines, the touch signal input pins are configured to be connected with touch input lines, and touch signals are output to the touch signal output pins through the touch input lines and the touch signal input pins.

2. The touch panel according to claim 1, wherein the plurality of pins located in the chip region further comprises a plurality of display pins, the plurality of display pins are arranged along the first edge and the second edge, and the plurality of display pins are configured to be connected with display signal lines.

3. The touch panel according to claim 2, wherein the plurality of display pins comprise a plurality of display signal output pins and a plurality of display signal input pins, the plurality of display signal output pins are arranged in the first pin region, and the plurality of display signal input pins are arranged in the second pin region; and the plurality of display signal output pins are configured to be connected with data signal lines, and the display signal input pins are configured to be connected with an external circuit board through display connection lines and a pin bonding region of the bonding region to enable the external circuit board to provide display signals through the pin bonding region, the display connection lines, and the display signal input pins.

4. The touch panel according to claim 3, wherein the chip region further comprises at least one second connection line, the at least one second connection line is configured to be connected with part of the display signal input pins, and is arranged on a side of the display signal input pins close to the touch region.

5. The touch panel according to claim 1, wherein the chip region has a centerline, the plurality of touch pins and the plurality of touch signal lines in the chip region are arranged symmetrically relative to the centerline, and the centerline is a straight line extending along the first direction and equally dividing the chip region;

the plurality of touch signal lines comprise a first group of touch signal lines and a second group of touch signal lines that are arranged symmetrically relative to the centerline, wherein the first group of touch signal lines comprises a first output line group and a second output line group, the first output line group comprises a plurality of first touch signal lines, the second output line group comprises a plurality of second touch signal lines, the first output line group is arranged on a side of the second output line group away from the centerline, and the plurality of first touch signal lines and the plurality of second touch signal lines are correspondingly connected with a plurality of touch signal output pins in the third pin region; and the second group of touch signal lines comprises a third output line group and a fourth output line group, the third output line group comprises a plurality of third touch signal lines, the fourth output line group comprises a plurality of fourth touch signal lines, the third output line group is arranged on a side of the fourth output line group away from the centerline, and the plurality of third touch signal lines and the plurality of fourth touch signal lines are correspondingly connected with a plurality of touch signal output pins in the fourth pin region.

6. The touch panel according to claim 5, wherein a first touch signal line comprises a first output line segment, a second output line segment, a third output line segment, and a fourth output line segment that are sequentially connected, the first output line segment extends along the first direction, the second output line segment and the fourth output line segment extend along the second direction, there is a first included angle between the third output line segment and the second direction, and the first included angle is in a range of 20° to 80°.

7. The touch panel according to claim 5, wherein a second touch signal line comprises a first output line segment, a second output line segment, a third output line segment, and a fourth output line segment that are sequentially connected, wherein the second output line segment and the fourth output line segment extend along the second direction, there is a second included angle between the third output line segment and the second direction, and the second included angle is in a range of 20° to 80°.

8. The touch panel according to claim 7, wherein a plurality of first output line segments comprise a first output line segment group and a second output line segment group, the first output line segment group comprises a plurality of first broken lines bent in a direction close to the centerline, the second output line segment group comprises a plurality of second broken lines bent in a direction away from the centerline, the plurality of first broken lines and the plurality of second broken lines form at least one polygonal region, and at least one dummy pin is arranged in the at least one polygonal region.

9. The touch panel according to claim 5, wherein the chip region further comprises at least one dummy pin, the dummy pin is arranged at one or more of following positions: between the first output line group and the second output line group, between the third output line group and the fourth output line group, on a side of the second output line group away from the first output line group, on a side of the fourth output line group away from the third output line group, and on the centerline.

10. The touch panel according to claim 5, wherein the chip region further comprises at least one first connection line, the at least one first connection line is configured to be connected with part of the touch signal input pins, and is arranged on a side of the touch signal input pins close to the centerline.

11. The touch panel according to claim 1, wherein a multi-row staggered arrangement structure is used for a plurality of pins in at least one of the first pin region, the second pin region, the third pin region, the fourth pin region, the fifth pin region, and the sixth pin region.

12. The touch panel according to claim 11, wherein single-row transverse alignment is used for pins in the first pin region and/or the second pin region, the plurality of pins are sequentially arranged along the second direction and are aligned in the first direction;

or, a two-row transverse staggered arrangement structure is used for the pins in the first pin region and/or the second pin region, wherein the two-row transverse staggered arrangement structure comprises a first pin row and a second pin row that are arranged along the first direction, a plurality of pins in the first pin row and the second pin row are sequentially arranged along the second direction, and a plurality of pins in the first pin row and a plurality of pins in the second pin row are arranged in a staggered manner in the second direction.

13. The touch panel according to claim 11, wherein single-row longitudinal alignment is used for at least one of the third pin region, the fourth pin region, the fifth pin region, and the sixth pin region, the plurality of pins are sequentially arranged along the first direction and are aligned in the second direction; or, a two-row longitudinal staggered arrangement structure is used for at least one of the third pin region, the fourth pin region, the fifth pin region, and the sixth pin region, wherein the two-row longitudinal staggered arrangement structure comprises a first pin column and a second pin column that are arranged along the second direction, a plurality of pins in the first pin column and the second pin column are sequentially arranged along the first direction, and a plurality of pins in the first pin column and a plurality of pins in the second pin column are arranged in a staggered manner in the first direction.

14. The touch panel according to claim 11, wherein each of the third pin region and the fourth pin region comprises a plurality of touch signal output pins and at least one idle pin, and the touch signal lines are connected with the touch signal output pins and are not connected with the at least one idle pin.

15. The touch panel according to claim 14, wherein each of the third pin region and the fourth pin region further comprises at least one first grounding pin and at least one second grounding pin, the first grounding pin is connected with a first grounding line, and the second grounding pin is connected with a second grounding line; and the at least one idle pin is arranged between the first grounding pin and the touch signal output pins, and/or, the at least one idle pin is arranged between the touch signal output pins.

16. The touch panel according to claim 11, wherein each of the fifth pin region and the sixth pin region further comprises a plurality of touch signal input pins and at least one idle pin, and touch input lines are connected with the touch signal input pins and are not connected with the at least one idle pin.

17. The touch panel according to claim 16, wherein the at least one idle pin is arranged between touch signal output pins and the touch signal input pins.

18. The touch panel according to claim 1, wherein the first edge and the second edge extend along a second direction, the second edge is located on a side of the first edge away from the touch region, and the third edge and the fourth edge extend along the first direction, and the first direction intersects with the second direction.

19. A display apparatus, comprising the touch panel according to claim 1.

20. A method for preparing a touch panel, comprising:
forming a touch region and a bonding region, wherein the bonding region comprises:
a chip region, comprising a first edge, a second edge, a third edge, and a fourth edge;
a plurality of pins located in the chip region and comprising a plurality of touch pins, wherein the plurality of touch pins are arranged along the third edge and the fourth edge;
a plurality of touch electrodes located in the touch region; and
a plurality of touch signal lines located in the touch region and the bonding region, wherein the plurality of touch signal lines are correspondingly connected with the plurality of touch electrodes and the plurality of touch pins;

wherein the chip region comprises a first pin region, a second pin region, a third pin region, a fourth pin region, a fifth pin region, and a sixth pin region, the first pin region is arranged along the first edge of the chip region, the second pin region is arranged along the second edge of the chip region, the third pin region and the fifth pin region are sequentially arranged along the third edge of the chip region, and the fourth pin region and the sixth pin region are sequentially arranged along the fourth edge of the chip region; and the plurality of touch pins comprise a plurality of touch signal output pins and a plurality of touch signal input pins, the plurality of touch signal output pins are arranged in the third pin region and the fourth pin region, and the plurality of touch signal input pins are arranged in the fifth pin region and the sixth pin region; and the touch signal output pins are configured to be connected with the touch signal lines, the touch signal input pins are configured to be connected with touch input lines, and touch signals are output to the touch signal output pins through the touch input lines and the touch signal input pins.

* * * * *